US010691803B2

(12) United States Patent
Liguori et al.

(10) Patent No.: US 10,691,803 B2
(45) Date of Patent: Jun. 23, 2020

(54) SECURE EXECUTION ENVIRONMENT ON A SERVER

(71) Applicant: Amazon Technologies, Inc., Seattle, WA (US)

(72) Inventors: Anthony Nicholas Liguori, Bainbridge Island, WA (US); Jason Alexander Harland, Seattle, WA (US); Matthew Shawn Wilson, Bainbridge Island, WA (US); Nafea Bshara, San Jose, CA (US); Ziv Harel, Kibbutz Megiddo (IL); Darin Lee Frink, Lake Tapps, WA (US)

(73) Assignee: Amazon Technologies, Inc., Seattle, WA (US)

( * ) Notice: Subject to any disclaimer, the term of this patent is extended or adjusted under 35 U.S.C. 154(b) by 67 days.

(21) Appl. No.: 15/377,991

(22) Filed: Dec. 13, 2016

(65) Prior Publication Data

US 2018/0165455 A1    Jun. 14, 2018

(51) Int. Cl.
*G06F 21/57* (2013.01)
*G06F 9/4401* (2018.01)
*G06F 21/44* (2013.01)

(52) U.S. Cl.
CPC .......... *G06F 21/575* (2013.01); *G06F 9/4406* (2013.01); *G06F 9/4416* (2013.01); *G06F 21/44* (2013.01); *G06F 21/57* (2013.01)

(58) Field of Classification Search
None
See application file for complete search history.

(56) References Cited

U.S. PATENT DOCUMENTS 5,889,987 A * 3/1999 Nelson ............... G06F 12/0623
                                                        711/103
9,396,329 B2    7/2016 Vaidyanathan et al.
(Continued)

FOREIGN PATENT DOCUMENTS

CN         101894233       11/2010
EP         3089035         11/2016

OTHER PUBLICATIONS

Motherboard Wikipedia Article, published 2015.*
(Continued)

*Primary Examiner* — Kim Huynh
*Assistant Examiner* — Kevin M Stewart
(74) *Attorney, Agent, or Firm* — Kilpatrick Townsend & Stockton LLP

(57) ABSTRACT

Disclosed herein are techniques for maintaining a secure execution environment on a server. In one embodiment, the server includes a non-volatile memory storing firmware, a programmable security logic coupled to the non-volatile memory, an adapter device coupled to the programmable security logic, and a processor communicatively coupled to the non-volatile memory via the programmable security logic. The adapter device and/or the programmable security logic can verify the firmware in the non-volatile memory while holding the processor and/or a baseboard management controller (BMC) in power reset, release the processor and the BMC from reset to boot the processor and the BMC after the firmware is verified, and then disable communications between the processor and the BMC and deny at least some requests to write to the non-volatile memory by the processor or the BMC.

26 Claims, 12 Drawing Sheets

(56) References Cited

U.S. PATENT DOCUMENTS

| | | | |
|---|---|---|---|
| 2003/0140238 A1 | 7/2003 | Turkboylari | |
| 2004/0068723 A1 | 4/2004 | Graupner et al. | |
| 2005/0021968 A1* | 1/2005 | Zimmer | G06F 21/572 713/176 |
| 2005/0120160 A1 | 6/2005 | Plouffe et al. | |
| 2005/0235000 A1 | 10/2005 | Keil | |
| 2006/0026417 A1* | 2/2006 | Furusawa | G06F 21/575 713/2 |
| 2006/0117156 A1* | 6/2006 | Chai | G06F 12/1425 711/163 |
| 2009/0138896 A1* | 5/2009 | McKenney | G06F 9/4812 719/318 |
| 2009/0287900 A1* | 11/2009 | Kirscht | G06F 9/4406 711/173 |
| 2011/0107047 A1* | 5/2011 | Sela | G06F 21/604 711/163 |
| 2012/0255010 A1* | 10/2012 | Sallam | G06F 21/572 726/24 |
| 2014/0258446 A1 | 9/2014 | Bursell | |
| 2015/0154031 A1* | 6/2015 | Lewis | G06F 9/4406 713/2 |
| 2016/0019116 A1* | 1/2016 | Gopal | G06F 11/1417 714/19 |
| 2016/0070913 A1 | 3/2016 | Kulkarni et al. | |
| 2016/0301742 A1 | 10/2016 | Lowery | |
| 2016/0323143 A1 | 11/2016 | Kim et al. | |
| 2017/0161497 A1* | 6/2017 | Jeansonne | G06F 21/566 |
| 2017/0168851 A1* | 6/2017 | Lin | G06F 8/654 |
| 2018/0089435 A1* | 3/2018 | Zander | G06F 21/575 |
| 2018/0097839 A1* | 4/2018 | Upasani | H04L 9/0631 |

OTHER PUBLICATIONS

Expansion card, available at https://en.wikipedia.org/w/index.php?title=Expansion card&oldid=639881853, published Dec. 28, 2014.*

U.S. Appl. No. 15/377,973, filed Dec. 13, 2016, Titled: Reconfigurable Server.

PCT/US2017/065984 , "International Search Report and Written Opinion", dated Mar. 28, 2018, 13 pages.

* cited by examiner ent on a server

SECURE EXECUTION ENVIRONMENT ON A SERVER

BACKGROUND

Many organizations provide computing services over a plurality of communication networks. The computing services may include, for example, web-based services such as web storage or virtual servers that can be provided over the Internet to different clients. In some cases, servers may be rented out to clients based on need or usage.

BRIEF DESCRIPTION OF THE DRAWINGS

Various embodiments in accordance with the present disclosure will be described with reference to the drawings, in which.

DETAILED DESCRIPTION

Figure 1:
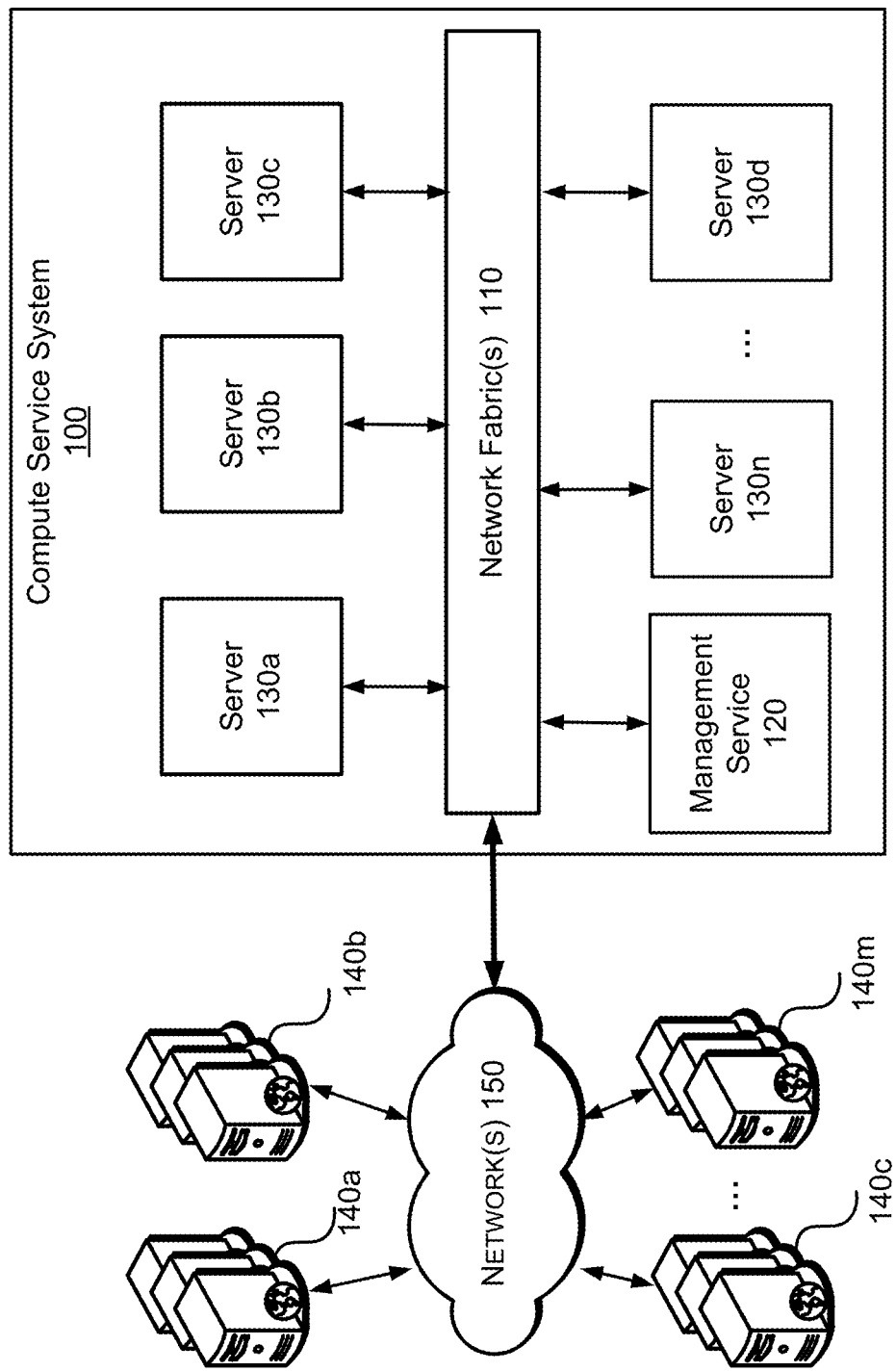
FIG. 1 illustrates an example compute service system in a web-based service environment, according to certain aspects of the present disclosure.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiments being described.

A compute service system may typically include a plurality of servers that can host data and be used by multiple clients or organizations to run instances, such as virtual machine instances or bare-metal instances (e.g., operating systems that run directly on the server hardware). In most cases, instances, such as bare-metal or virtual machine instances, in a multi-tenant compute service system may be allocated to a client when the client needs them and decommissioned when they are no longer needed, such that the resources can be reallocated to other clients. In the present disclosure, the terms "tenant," "client," and "customer" may be used interchangeably. The term "instance" may refer to, for example, an instance that executed directly on server hardware or as a virtual machine. Different types of instances generally correspond to different hardware functions.

Typically, the operator of the compute service uses its own virtualization system (e.g., a hypervisor or virtual machine monitor) on the servers and the clients only receive access to the instances. In some cases, a client may prefer to run directly on the server's hardware or use its own virtualization system to instantiate its own virtual machines as needed. For example, a client may want to use a customer hypervisor, make specific changes to a commercially available hypervisor to enable certain models, or prefer one hypervisor over another, e.g., Microsoft Hyper-V® over VMware vSphere® or open-source Kernel-based Virtual Machine (KVM). In addition, in a virtualized compute service system, performance degradation may occur due to the introduction of a hypervisor layer. While the hypervisor enables the visibility, flexibility, and management capabilities required to run multiple virtual machines on the same resources, it also creates additional processing overhead and may not integrate with tools the user wants to use with the hypervisor. However, if access to the hardware is granted a customer could potentially damage the hardware or attempt to modify the firmware to attack future customers that use the hardware.

For example, in bare-metal environment, a customer may try to modify the firmware on the server to adversely affect the execution environment when the server is rebooted and rented to a second customer. The firmware may, for example, direct data on the server to an unsecure location, thus compromising the security of the data of the second client on the server.

Embodiments of the present disclosure relate to maintaining a secure execution environment on servers in a compute service system, where the secure execution environment uses a verified boot firmware and is isolated from other potential security threats persistent from previous clients or originated from other components of the server that may be accessible through network connections. More specifically, a server may include a motherboard with various devices and non-volatile memories storing firmware, a programmable security logic coupled to the non-volatile memories and configured to control access to the non-volatile memories, and a processor coupled to the programmable security logic and communicatively coupled to the non-volatile memories via the programmable security logic. The programmable security logic may be controlled by an adapter device coupled to the programmable security logic to change accessibility to the non-volatile memories at different times. The adapter device and the programmable security logic, alone or in combination, may be configured to verify the firmware in the non-volatile memories before allowing the processor and/or a baseboard management controller (BMC) to start a boot sequence; scrub data remaining in volatile memory or processing logic, such as a processor or a Graphic Processing Unit (GPU); control access to the non-volatile memories; and control connectivity between processing units and buses, such as Peripheral Component Interconnect Express (PCIe), Low Pin Count (LPC), or Universal Serial Bus (USB) buses.

Different accessibilities to different regions of the non-volatile memory at different times by different components may be controlled by the adapter device and the programmable security logic. For example, in an open or unprotected mode, some or all regions of the non-volatile memory may be readable by some or all components of the server, and some or all regions of the non-volatile memory may be writable by some or all components of the server. In a secure or protected mode, some or all regions of the non-volatile memory may not be readable by some or all components of the server, and some or all regions of the non-volatile memory may not be writable by some or all components of the server. Additionally, in the secure or protected mode, some untrusted components of the server, for example, components that may have unsecure network access, such as a BMC, may be disconnected from, for example, the processor, such that the client execution environment and client data may not be accessible to the untrusted components of the server.

It is noted that although embodiments in the present disclosure describe securing firmware or other data or code stored on non-volatile memory, techniques disclosed herein can be used to secure any user-accessible volatile or non-volatile memory, any user accessible hardware components, any user accessible software, any user accessible database, and/or any user accessible firmware. For example, techniques disclosed herein can be used to protect any software that a user can execute on a server, either directly or remotely through a network, such as via an unsecured agent (e.g., the BMC), where the software may be stored in volatile or non-volatile memory.

FIG. 1 illustrates an example compute service system 100 in a web-based service environment, according to certain aspects of the present disclosure. In the web-based service environment, one or more clients may utilize client devices 140a-140m (collectively, client devices 140) to access compute service system 100 via one or more networks 150. For example, client devices 140 may access compute service system 100 using a web browser, a command line interface, or a web service API. Client devices 140 may include any appropriate device operable to send and receive requests, messages, or other information over an appropriate network 150 and convey information back to a client of the device, such as, but not limited to, a mobile phone, a smart phone, a Personal Digital Assistant (PDA), a laptop computer, a desktop computer, a thin-client device, a tablet, an electronic book (e-book) reader, etc.

In some examples, networks 150 may include any one or a combination of many different types of networks, such as cable networks, the Internet, wireless networks, cellular networks, and other private and/or public networks. Communications over the networks may be enabled by wired or wireless connections and combinations thereof. Networks 150 may support communications using any of a variety of commercially-available protocols, such as Transmission Control Protocol/Internet Protocol (TCP/IP), Open System Interconnection (OSI), File Transfer Protocol (FTP), Universal Plug and Play (UpnP), Network File System (NFS), Common Internet File System (CIFS), and AppleTalk®.

Compute service system 100 may include a management service 120 and a plurality of servers 130a, 130b, 130c, 130d, . . . , and 130n (collectively, servers 130) in a distributed computing environment. Management service 120 and servers 130 may be communicatively coupled to one or more network fabrics 110, which may be connected to networks 150 through, for example, high speed network connection, such as InfiniBand, Data Center Ethernet (DCE), gigabit Ethernet, fiber channel, or Fiber Channel over Ethernet (FCoE) etc. Network fabrics 110 may be any appropriate network, including an intranet, the Internet, a cellular network, a local area network, or any combination thereof. Network fabrics 110 may support communications using any of a variety of high speed communication protocols.

Servers 130 may include one or more servers or servers, arranged in a cluster as a server farm, or as individual servers not associated with one another. These servers may be configured to host instances. In some implementations, each server of servers 130 may have identical or similar hardware resources. In some implementations, servers 130 may include a plurality of different types of servers that may have different resources and/or configurations.

Management service 120 may be a server or platform that is configured to manage a pool of heterogeneous resources (e.g., servers or specialized hardware resources), provide access to clients and end users, monitor security, and manage resource allocation. For example, management service 120 may receive requests from client devices 140 and select one or more servers 130 to provision the requested instance based on the specific request from the client. In some cases, management service 120 may allocate a predetermined number of resources to a client who may pay a flat fee or a monthly fee. In some cases, for a client that is charged on a pay-per-use basis, management service 120 may allocate resources to the client when the client needs them and decommission them when they are no longer needed, such that the resources can be allocated to other clients. Management service 120 may include a network interface for communication with network fabrics 110, a database for storing configurations and status of servers 130 connected to network fabrics 110, and a processing logic for selecting one or more available servers for an instance and performing other management functions.

As described above, client devices 140 may request different types of instances (e.g., virtual machines or servers) from compute service system 100. For example, in some cases, a client may request an instance to perform complex computational workloads, such as batch processing, distributed analytics, high performance scientific or engineering applications, gaming, or video-encoding. In some cases, a client may request an instance for applications sensitive to network performance.

In some cases, a client may request a specific system hardware configuration. For example, the client may specify the number of processor cores, the size of the memory, the size of the storage device (e.g., a solid state drive (SSD)), and/or the operating system or Virtual Machine Monitor (VMM, i.e., hypervisor) needed for the applications. In some cases, the client may select a type of instance from multiple types of instances offered by the compute service system. For example, a compute service provider may offer different types or families of instances based on compute, memory, and storage capabilities, where different types of instances may provide different capabilities on computing performance, I/O performance, memory size and performance, storage size and performance, network performance, and graphic processing performance. And, in some cases, the client may request a particular operating system or hypervisor to run on the server, such as Microsoft Windows®, Linux, Microsoft Hyper-V®, Xen®, or VMware vSphere®. In some cases, the client may request a specific type of hardware, such as GPUs or SSDs. As such, in embodiments of the present disclosure the compute service provider may offer one or more "bare-metal" instance types. The bare-metal instance types can have differing combinations of hardware.

In some cases, a client's workloads and applications may demand higher performance than the virtualization layer allows, or the client may want to use a different virtualization system on hardware managed by the compute service provider. The client may rent a server as a bare-metal instance and use its own operating system on the server, in order to remove the hypervisor and the performance impact caused by virtualization. The hardware of the bare-metal instance may be fully dedicated to the client, including any additional storage, during the time period that the sever is rented to the client.

In response to web-service requests for a bare-metal instance from a client, management service 120 may select one or more servers to allocate to the client. For example, in implementations where the servers may have different hardware resources, management service 120 may select a server that best matches the requirement of the client-requested instance with minimum extra resources. In implementations where all servers have the same or similar hardware resources, management service 120 may randomly select any available server, or a cluster of available servers that are closely located. In some implementations, management service 120 may select a server that is capable of provisioning a bare-metal instance.

Figure 2:
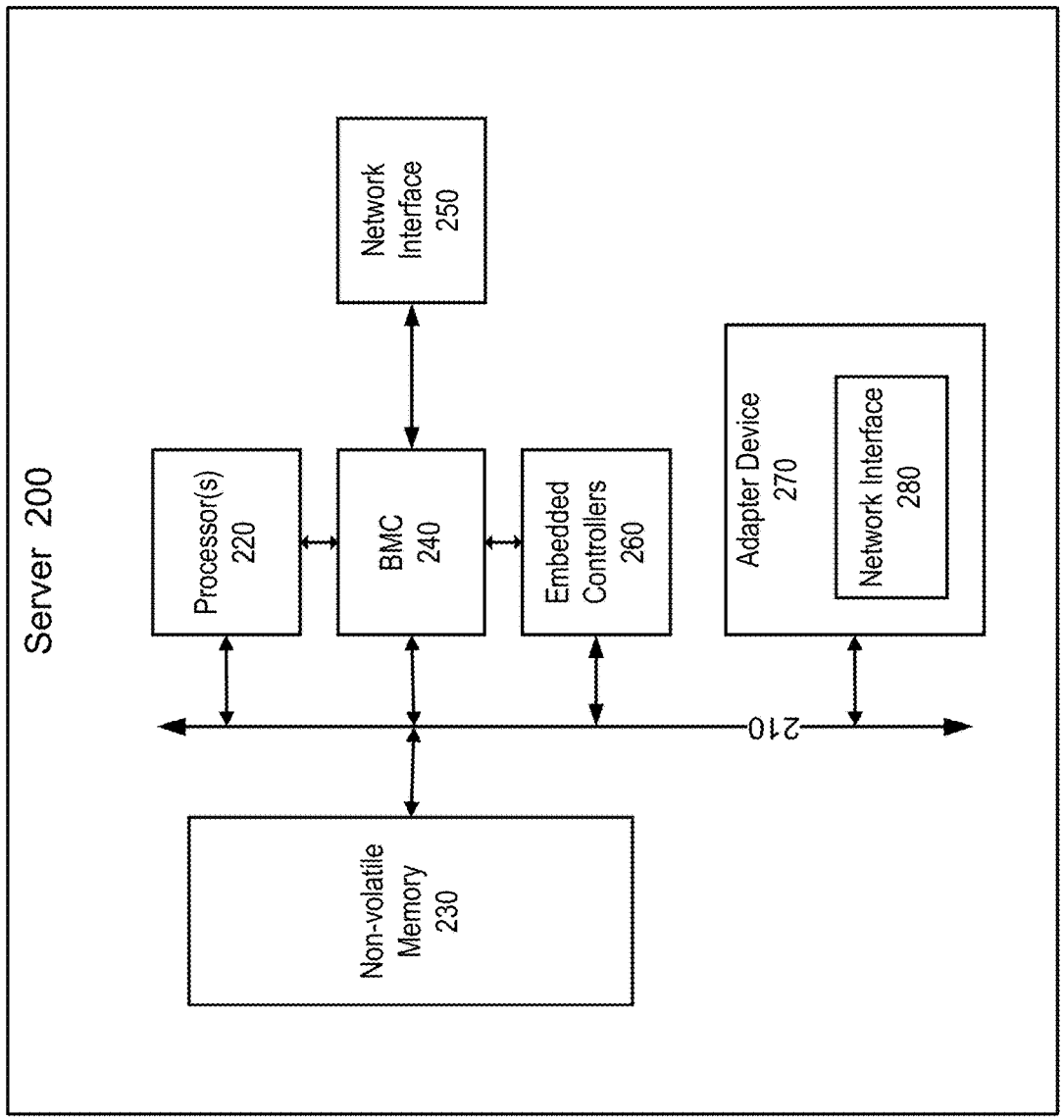
FIG. 2 is a simplified block diagram of an example server in a compute service system, according to certain aspects of the present disclosure.

FIG. 2 is a simplified block diagram of an example server 200 in a compute service system, according to certain aspects of the present disclosure. Many components or modules of server 200 are omitted in FIG. 2 in order not to obscure the features being described herein. One skilled in the relevant art will appreciate that the disclosed illustrative components are not meant to be an exhaustive identification of all the components required by or present in a server. Rather, illustrative components have been identified, in a non-limiting manner, to facilitate illustration of one or more aspects of the present disclosure. Still further, the illustrative components of server 200 may be logical in nature such that the physical implementation of one or more components can be varied or such that one or more of the logical components may be implemented in a virtualized manner. Additionally, one or more servers 200 may share one or more of the illustrated or unillustrated components, such as processors, graphical processing units, memory, storage, and the like.

In an illustrative embodiment, server 200 may be associated with various hardware components, software components, and respective configurations that facilitate the execution of client applications. In some implementations, server 200 may provide a multi-tenant platform to multiple clients through multiple adapter devices. In some embodiments, server 200 may be dedicated to a client at a given time, while no other client may have access to server 200 at the same time.

Specifically, in the example embodiment shown in FIG. 2, server 200 may include one or more adapter devices, such as an adapter device 270. Communications between adapter device 270 and other components of server 200 may be performed using one or more communication channels 210, which may use interfaces such as Peripheral Component Interconnect (PCI) interfaces, PCI Express (PCIe) interfaces, PCI Extended (PCI-X) interfaces, or any other suitable interfaces. Communication channels 210 may include one or more buses, meshes, matrices, fabrics, a combination of these communication channels, or some other suitable communication channels. For example, communication channel 210 may correspond to a shared bus (e.g., a front side bus, a memory bus), a point-to-point bus such as a PCI or PCIe bus, etc., in which the components of server 200 communicate.

Server 200 may be a server, for example, an x86 server. Server 200 may include one or more processors 220, which may include, for example, one or more x86 processor cores, or other circuits capable of executing machine-readable instructions. In some embodiments, processor(s) 220 may also include GPUs. Processor(s) 220 may include application specific integrated circuits (ASICs), field programmable gate arrays (FPGAs), systems-on-chip (SoCs), network processing units (NPUs), processors configured to execute instructions, or any other circuitry configured to perform logical arithmetic and floating point operations. Examples of processors that may be included in processor(s) 220 may include processors developed by ARM®, MIPS®, AMD®, Intel®, Qualcomm®, and the like. In certain implementations, processor(s) 220 may include multiple processors or processing cores, wherein each processing core may be configured to execute instructions independent of other processing cores. Furthermore, in certain implementations, each processor or processing core may implement multiple processing threads executing instructions on the same processor or processing core, while maintaining logical separation between the multiple processing threads. Such processing threads executing on the processor or processing core may be exposed to software as separate logical processors or processing cores. In some implementations, multiple processors, processing cores, or processing threads executing on the same core may share certain resources, such as, for example, busses, level 1 (L1) caches, and/or level 2 (L2) caches. The instructions executed by processor(s) 220 may be stored on a computer-readable storage medium, for example, in the form of a computer program.

In some implementations, server 200 may include a second processor, such as a baseboard management controller (BMC) 240 for managing the operation of server 200 in accordance with, for example, the Intelligent Platform Management Interface (IPMI) standard. BMC 240 may be connected to a network through a network interface 250, such as an Ethernet connection. A system administrator may communicate with BMC 240 through network interface 250. The IPMI subsystem on the motherboard of server 200 may include BMC 240 as the main controller, and other embedded controllers 260 (which may be referred to as satellite controllers) distributed among different system modules. Embedded controllers 260 may be connected to BMC 240 via an Intelligent Platform Management Bus/Bridge (IPMB) interface—an enhanced implementation of Inter-Integrated Circuit ($I^2C$) interface.

BMC 240 may include a processing logic that monitors the physical states of server 210 using sensors controlled by embedded controllers 260 and communicate with a system administrator using an independent network connection through network interface 250. Different types of sensors may be built into server 200 and controlled by embedded controllers 260. The sensors may measure internal physical parameters, such as temperature, humidity, power-supply voltage, fan speeds, communications parameters, and operating system functions, and report to BMC 240. BMC 240 may monitor the sensors and send alerts to a system administrator via the network if any of the parameters does not stay within preset limits, indicating a potential failure or risk of the system.

BMC 240 may provide management and monitoring capabilities independently of processor(s) 220, the firmware (e.g., Basic Input/Output System (BIOS)), and the operating system of server 200. BMC 240 may be used by system administrators for monitoring and managing the operations of server 200, using, for example, IPMI interfaces. For example, a system administrator may, using BMC 240 through IPMI interfaces, manage a server that may be powered off or otherwise unresponsive through a network connection to BMC 240, or login independent of the operating system to manage server 200 remotely even in the absence of an operating system or a system management software. System administrators may use BMC 240 to monitor status of server 200, such as temperatures, voltages, fans, power supplies, and chassis intrusion; identify devices and query real-time inventory information of server 200; review hardware logs; or take some corrective actions, for example, performing recovery procedures such as resetting or rebooting server 200 to get a hung operating system running again or power down server 200 if necessary, from a remote console through a network connection, such as an Ethernet connection via network interface 250. In this way, a system administrator can remotely manage numerous servers and other devices simultaneously, saving on the overall operating cost of the network and helping to ensure its reliability.

Server 200 may also include a non-volatile memory 230, which may include non-transitory executable code, often referred to as firmware, which can be executed by processor(s) 220 to cause components of server 200 to initialize and identify system devices such as the video display card, keyboard and mouse, hard disk drive, optical disc drive, and other hardware. Non-volatile memory 230 may also include firmware for BMC 240 and embedded controllers 260. Non-volatile memory 230 may be connected to (or in communication with) a number of components of server 200, such as processor(s) 220, BMC 240, embedded controllers 260, and the like, using, for example, one or more communication channels 210, such as Serial Peripheral Interface (SPI) buses, I$^2$C buses, Serial Advanced Technology Attachment (SATA) buses, or other suitable buses. Non-volatile memory 230 may also include or locate boot loader software that may be utilized to boot server 200. For example, in one embodiment, non-volatile memory 230 may include executable code that, when executed by processor(s) 220, causes server 200 to attempt to locate Preboot Execution Environment (PXE) boot software. In some embodiments, non-volatile memory 230 may include a flash memory or a read-only memory (ROM). In some embodiments, non-volatile memory 230 may include one memory device. In some other embodiments, non-volatile memory 230 may include two or more memory devices, where each memory device may store firmware for a component of server 200, such as processor(s) 220, BMC 240, or embedded controllers 260. While FIG. 2 shows a single non-volatile memory, in various embodiments, the non-volatile memory can be one or more non-volatile memories. For example, each component can have its own non-volatile memory that stores firmware, data, etc. for the component.

Although not shown in FIG. 2, server 200 may include other components or modules. For example, in some embodiments, server 200 may include a memory module, which may include, for example, a random access memory (RAM), dynamic random access memory (DRAM), or a synchronous dynamic random-access memory (SDRAM), such as double data rate (DDR), DDR2, DDR3, or DDR4 SDRAM. In some embodiments, the memory module may include several levels of cache hierarchy, such as Level 1 (L1) caches, Level 2 (L2) caches, Level 3 (L3), or last level caches. In some embodiments, server 200 may include one or more controllers for managing internal or peripheral devices (not shown) of server 200, such as hard drives or other forms of memory. One example of the controllers may be a SATA hard drive controller.

Adapter device 270 may include, for example, a processing logic (e.g., a processor), non-volatile memory (e.g., flash memory), and volatile memory (e.g., RAM). In some embodiments, adapter device 270 may be coupled to server 200 using, for example, a plug-in card or soldered to the motherboard of server 200. Adapter device 270 may provide various functions, such as traffic monitoring, traffic shaping, computing, billing, encryption, etc. Adapter device 270 may also provide physical and virtual services to server 200 and/or virtual processes running on server 200. In some embodiments, adapter device 270 may communicate as a standard bridge component for facilitating access between various physical and emulated components of server 200 and one or more network fabrics, such as network fabrics 110, using a network interface 280. In some embodiments, adapter device 270 may include embedded microprocessors to allow the adapter device to execute computer executable instructions related to the implementation of management functions, or to execute other computer executable instructions related to client applications. In some embodiments, adapter device 270 may be implemented using multiple discrete hardware elements, such as multiple cards, multiple integrated circuits, or other devices. In some embodiments, adapter device 270 may be attached externally to server 200. In some embodiments, adapter device 270 may be integrated into server 200. In various embodiments, adapter device 270 may include reconfigurable hardware resources such that they can be dynamically configured into different hardware configurations or to provide different hardware functionalities.

In some implementations, network interface 280 may include hardware and/or software configured to implement a protocol for communicating with externally connected devices or functions. For example, network interface 280 may include hardware and/or software for communicating with a network. Network interface 280 may, for example, include physical connectors or physical network ports for wired connection to a network, and/or antennas for wireless communication to a network. Network interface 280 may further include hardware and/or software configured to implement a network protocol stack. Network interface 280 may communicate with a network using a network protocol, such as, for example, TCP/IP, InfiniBand, Remote Direct Memory Access (RDMA) over Converged Ethernet (RoCE), Institute of Electrical and Electronics Engineers (IEEE) 802.11 wireless protocols, User Datagram Protocol (UDP), Asynchronous Transfer Mode (ATM), token ring, frame relay, High Level Data Link Control (HDLC), Fiber Distributed Data Interface (FDDI), and/or Point-to-Point Protocol (PPP), among others. In some implementations, adapter device 270 may include multiple network interface modules, each configured to communicate with a different network, such as a wired Ethernet network, a wireless 802.11 network, a cellular network, or an InfiniBand network, etc.

Although not shown in FIG. 2, adapter device 270 may include other components or modules, such as mass storage controllers, network controllers, display controllers, memory controllers, serial bus controllers, wireless controllers, or encryption and decryption controllers, among others. For example, adapter device 270 may include a non-volatile memory that stores firmware that can be executed by a processor to cause components of adapter device 270 to initialize and identify modules of the adapter device. The non-volatile memory may include boot loader software that will be utilized to boot adapter device 270. The non-volatile memory may also include firmware that may be used to configure and boot adapter device 270 for performing different hardware functionalities based on client requests. In some embodiments, the non-volatile memory may include a flash memory. In some embodiments, the non-volatile memory for adapter device 270 may be the same as the non-volatile memory 230.

In some implementations, adapter device 270 may be a PCI-based device. In these implementations, adapter device 270 may include a PCI interface for communicating with other components of server 200. The term "PCI" may be used to describe any protocol in the PCI family of bus protocols, including the original PCI standard, AGP, PCIe, and PCI-X. The PCI protocols are standard bus protocols for connecting local peripheral devices to servers. A standard bus protocol is a data transfer protocol for which a specification has been defined and adopted by various manufacturers. Manufacturers ensure that compliant devices are compatible with computing systems implementing the bus protocol and vice versa. As used herein, PCI-based devices also include devices that communicate using Non-Volatile Memory Express (NVMe), which is a device interface specification for accessing non-volatile storage media attached to a computing system using PCIe.

In some embodiments, various components and modules of adapter device 270 and server 200 described above may be implemented as discrete components, as a System-on-Chip (SoC), as an ASIC, as a NPU, as an FPGA, or any combination thereof.

Figure 3:
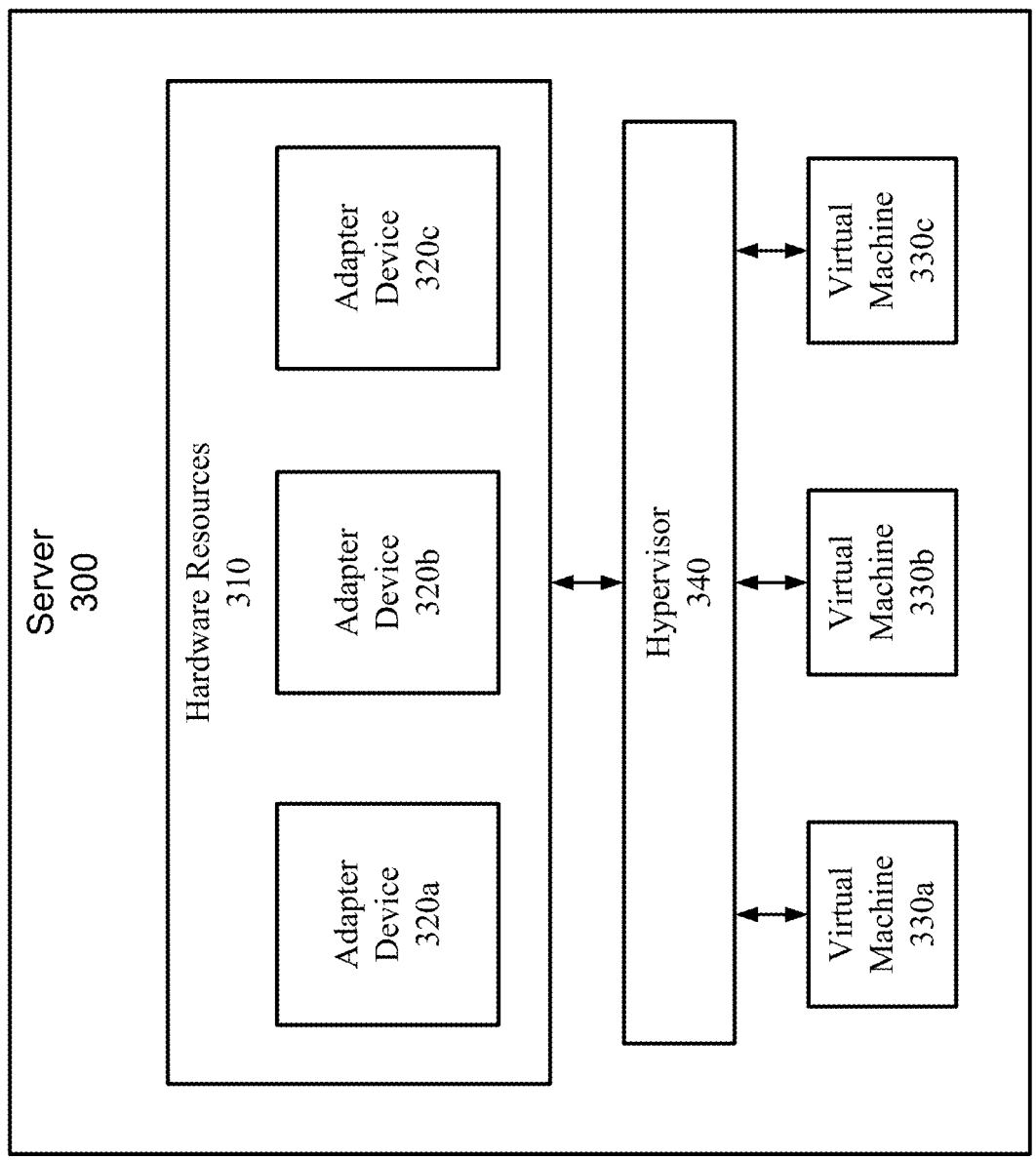
FIG. 3 illustrates an example server configured to provide virtualized services in a compute service system, according to certain aspects of the present disclosure.

FIG. 3 illustrates an example server 300 configured to provide host instances, such as bare-metal instances, according to certain aspects of the present disclosure. Server 300 may be a server that has been configured to run a hypervisor on underlying hardware resources, where different operating systems may run on the hypervisor in different virtual machines. Server 300 may include hardware resources 310 that include one or more adapter devices, such as adapter devices 320*a*, 320*b*, and 320*c* (collectively adapter devices 320), where each adapter device may be used for a corresponding virtual machine. In this example, a customer may have installed their own hypervisor on the bare-metal instance and can use it to control its virtual machines.

As shown in FIG. 3, server 300 may execute a hypervisor 340 on underlying hardware resources 310. One or more processes, such as virtual machines 330*a*, 330*b*, and 330*c* (collectively virtual machines 330), may be managed by hypervisor 340. Some or all of the virtual hardware of a virtual machine may be emulated by an adapter device 320. In some embodiments, adapter devices 320 may be virtual adapter devices and may be emulated by a same card or SoC. Virtual machines 330 may be any suitable emulation of a computer system. Each virtual machine 330 may be in communication with an adapter device 320 or a virtual adapter device via a data path.

Virtual machines 330 running on server 300 may be managed by hypervisor 340. Hypervisor 340 may, for example, be configured to create, start, monitor, stop, and delete virtual machines 330. In addition, hypervisor 340 may be configured to communicate with adapter devices 320 such that adapter devices 320 may create or remove a virtual adapter device. Virtual machines 330 may be assigned priorities such that the transactions initiated by one virtual machine 330 (e.g., 330*a*) may take precedence over transactions initiated by another virtual machine 330 (e.g., 330*b*). In some embodiments, the priorities may only take effect when the resources of server 300 or adapter devices 320 are heavily occupied. Priorities may take the form of service level agreements. A service level agreement may, for example, indicate an amount of resource usage permitted for a virtual machine. For example, service level agreements may indicate that a virtual machine (e.g., 330*c*) may only be allowed a certain amount of network bandwidth, host memory, and/or adapter device usage.

Each adapter device 320 may have been configured to provide a particular type of instance to a client by configuring each adapter device 320 based on the request from the client, as described above. Server 300 may be configured by rebooting using firmware stored in a non-volatile memory on server 300, such as non-volatile memory 230 of FIG. 2 described above. In some embodiments, during rebooting, server 300 may load a customer hypervisor, rather than a hypervisor provided by the compute service provider. After the hypervisor boots, it can be controlled by a customer to launch additional virtual machines. For example, when the customer submits a bare-metal instance request, the request could identify a virtualization system to load. In response, the compute service provider can prepare server 300 by attaching a network drive or downloading to storage a bare-metal instance image, both of which may include a copy of the virtualization system. After server 300 executes it's provisioning process described in more detail in subsequent paragraphs, it can execute the virtualization system from storage.

Figure 4:
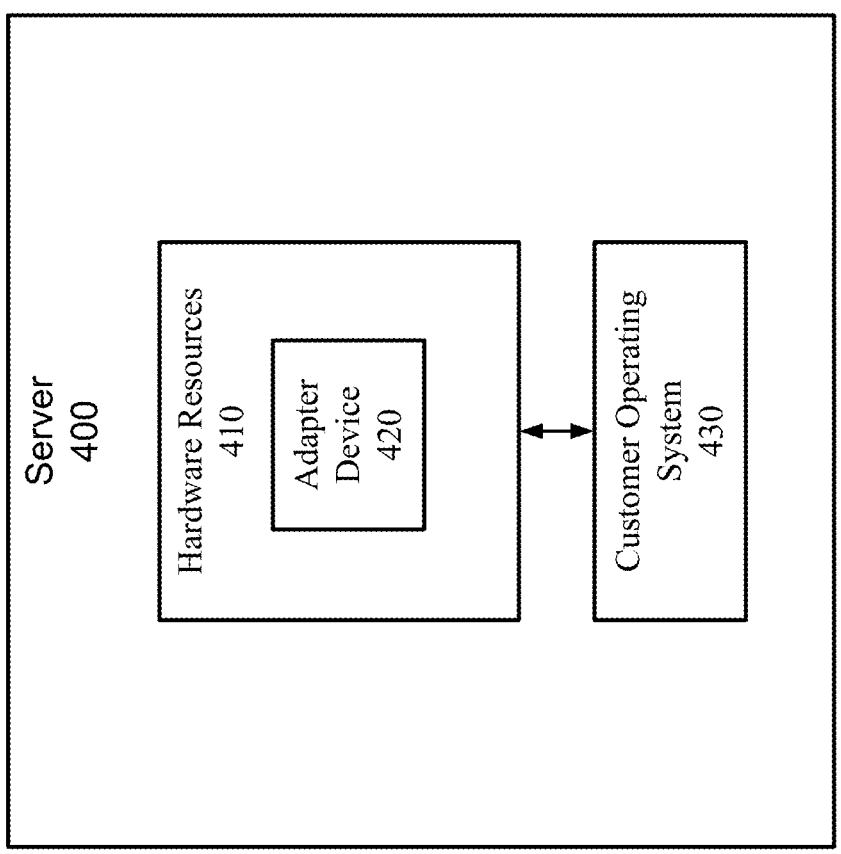
FIG. 4 illustrates an example server configured as a bare-metal instance in a compute service system, according to certain aspects of the present disclosure.

FIG. 4 illustrates an example server 400 configured as a bare-metal instance in a compute service system, according to certain aspects of the present disclosure. Server 400 may be a server that has been configured as a bare-metal instance, and in this case, the customer may execute an operating system directly on the hardware instead of using a virtualization system to virtualize the resources of the server. Server 400 may include hardware resources 410 that includes an adapter device 420, such as an adapter device with a PCIe interface or any other suitable interface as described above. Adapter device 420 may have been configured to provide a particular type of instance to a client by rebooting using firmware corresponding to the particular type of instance and stored in a non-volatile memory.

Server 400 may include a customer operating system 430 running on hardware resources 410. Server 400 may be configured by rebooting using firmware stored in a non-volatile memory on server 400, such as non-volatile memory 230 of FIG. 2 described above. In some embodiments, after the server is configured, server 400 may load a customer operating system, such as Microsoft Windows, Linux, or MacOS, from, for example, a persistent storage device, such as a hard drive or an SSD. After the customer operating system is loaded through the booting process by a boot loader, the client can then run applications on the customer operating system to access and utilize hardware resources 410.

In this way, server 400 may be allocated to a client as a bare-metal instance, and the client may use its own operating system on underlying hardware resources 420 directly, without using a hypervisor or virtualization. The hardware of the bare-metal instance may be fully dedicated to the client, including any additional storage, during the time period that the sever is rented to the client.

Figure 5:
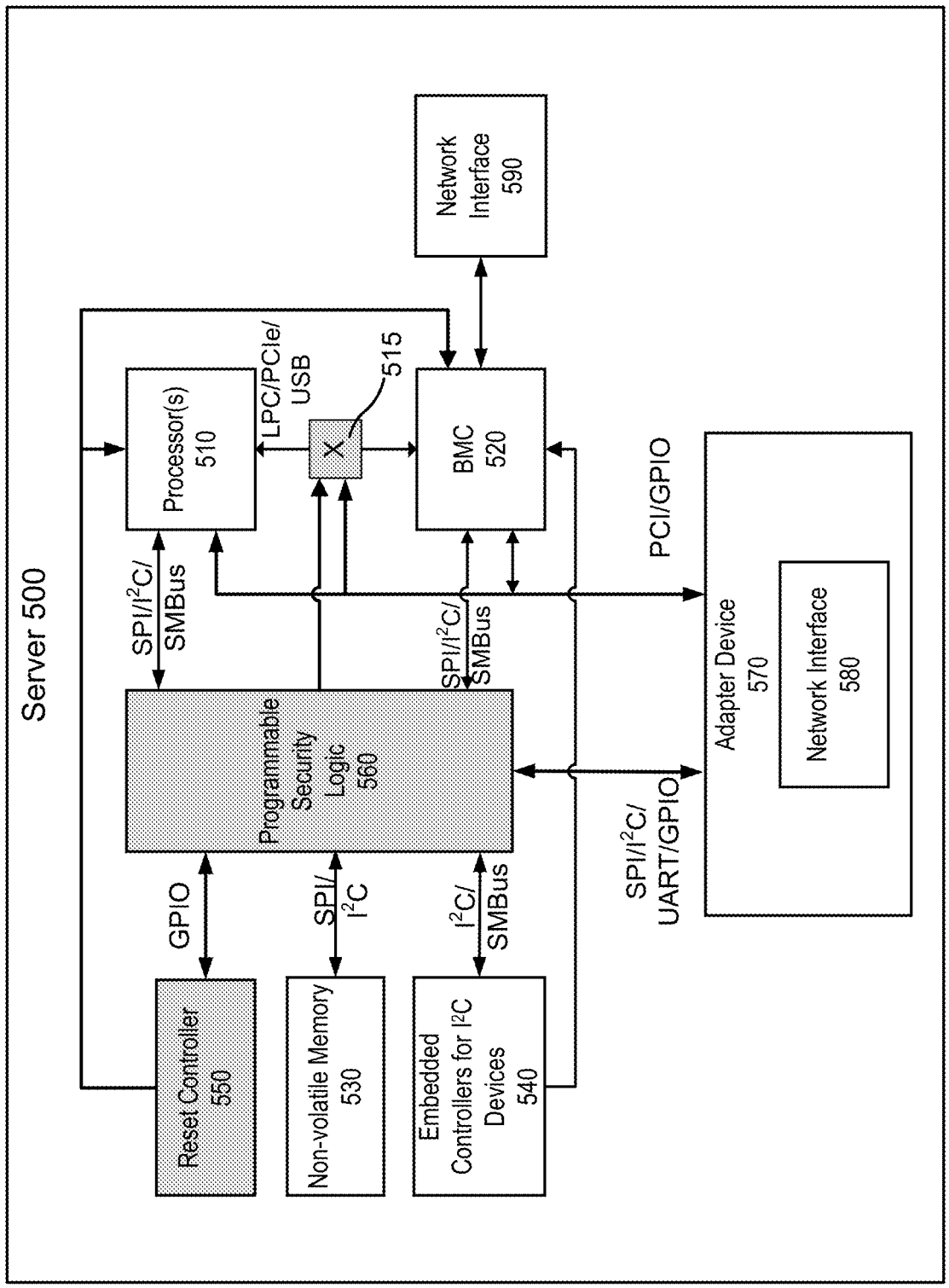
FIG. 5 is a simplified block diagram of an example server configured to host bare-metal instances, according to certain aspects of the present disclosure.

FIG. 5 is a simplified block diagram of an example server 500 configured to host bare-metal instances, according to certain aspects of the present disclosure. As in FIG. 2, many components or modules of server 500 are omitted in FIG. 5 in order not to obscure the features being described herein. One skilled in the relevant art will appreciate that the disclosed illustrative components are not meant to be an exhaustive identification of all the components required by or present in a server. Rather, illustrative components have been identified, in a non-limiting manner, to facilitate illustration of one or more aspects of the present application. Still further, the illustrative components of server 500 may be logical in nature such that the physical implementation of one or more components can be varied or such that one or more of the logical components may be implemented in a virtualized manner.

As server 200 of FIG. 2, server 500 may include one or more adapter devices, such as an adapter device 570. Communications between adapter device 570 and other components of server 500 may be performed using interfaces such as PCI interfaces, PCIe interfaces, PCI-X interfaces, SPI interfaces, I²C interfaces, or any other suitable interfaces.

Server 500 may include one or more processors 510, which may be similar to processor(s) 220 of FIG. 2 as described above. Server 500 may also include a special-purpose processor BMC 520 for managing the operation of server 500 in accordance with, for example, the IPMI standard. BMC 520 may be similar to BMC 240 of FIG. 2. A system administrator may communicate with BMC 520 through a network interface 590. Network interface 590 may be similar to network interface 250 of FIG. 2. Server 500 may also include embedded controllers 540 for I²C devices. The I²C devices may include sensors for measuring physical parameters on server 500, such as temperature, humidity, power-supply voltage, fan speeds, communications parameters, and operating system functions. In some embodiments, the sensors may use a communication interface different from I²C, such as, for example, IPMB, SPI, System Management Bus (SMBus), etc. Embedded controllers 540 for I²C devices may be similar to embedded controllers 260 of FIG. 2.

Server 500 may also include a non-volatile memory 530, which may store firmware for various components of server 500, such as processor(s) 510, BMC 520, and embedded controllers 540 for I²C devices, and other system devices such as the video display card, keyboard and mouse, hard disk drive, optical disc drive, and other hardware. Non-volatile memory 530 may be accessible, using, for example, SPI, I²C, or SMBus buses. In some embodiments, non-volatile memory 530 may include, for example, a flash memory or a read-only memory (ROM). In some embodiments, non-volatile memory 530 may include one memory device. In some other embodiments, non-volatile memory 530 may include two or more memory devices, where each memory device may store firmware for a component of server 500, such as processor(s) 510, BMC 520, or embedded controllers 540.

As adapter device 270 of FIG. 2, adapter device 570 may be coupled to server 500 using, for example, a plug-in card or soldered to the motherboard of server 500. Adapter device 570 may provide various functions, such as traffic monitoring, traffic shaping, computing, billing, or encryption, etc. Adapter device 570 may provide physical and virtual services to server 500 and/or virtual processes running on server 500. In various embodiments, adapter device 570 may include various components. In some embodiments, adapter device 570 may communicate as a standard bridge component for facilitating access between various physical and emulated components of server 500 and a network fabric, such as network fabrics 110 of FIG. 1, using a network interface 580. Network interface 580 may be similar to network interface 280 of FIG. 2. In some embodiments, adapter device 570 may include embedded microprocessors to allow the adapter device to execute computer executable instructions related to the implementation of management functions, or to execute other computer executable instructions related to client applications. In some embodiments, adapter device 570 may be implemented using multiple discrete hardware elements, such as multiple cards, multiple integrated circuits, or other devices. In some embodiments, adapter device 570 may be attached externally to server 500. In some embodiments, adapter device 570 may be integrated into server 500.

To create a bare-metal execution environment, other components or modules may be added to server 500, in addition to these components or modules that are similar to the corresponding components or modules in server 200 of FIG. 2. For example, a programmable security logic 560 may be added on the data path from processor(s) 510, BMC 520, embedded controllers 540, or other components of server 500 to non-volatile memory 530 that can execute or store software/firmware. For example, programmable security logic 560 can be installed on a motherboard and the output pins from components that connect to non-volatile memory 530 or memories, such as one or more processors 510, BMC 520, GPUs, or other execution units, can instead be fed to input pins of programmable security logic 560. Thus, to access non-volatile memory 530, processor(s) 510, BMC 520, embedded controllers 540, commands are routed through programmable security logic 560 using, for example, SPI, I²C, or SMBus, etc. In this regard, programmable security logic 560 can analyze, block, throttle, and/or filter commands sent to non-volatile memory 530. As used herein, throttling commands send to non-volatile memory may include only granting a limited number of read or write requests to access the non-volatile memory per unit time, such as per second, or only granting a limited number of read or write requests to access a region in the non-volatile memory per unit time. Programmable security logic 560 may be connected to and controlled by adapter device 570 through, for example, SPI, I²C, or Universal Asynchronous Receiver/Transmitter (UART) bus, general-purpose input/output (GPIO), etc. Programmable security logic 560 may maintain a blacklist of protected regions or a whitelist of unprotected region in non-volatile memory 530, and may control the accessibility of different regions in non-volatile memory 530 by processor(s) 510, BMC 520, embedded controllers 540, or other untrusted components at different times based on the blacklist (or whitelist) and instructions from adapter device 570. Programmable security logic 560 may include one of an FPGA, an SoC, an ASIC, a programmable array logic (PAL), and a complex programmable logic device (CPLD). Firmware for programmable security logic 560 may also be stored in non-volatile memory 530 or in non-volatile memory of adapter device 570. As such, in some embodiments, adapter device 570 can verify the software/firmware on programmable security logic 560 and/or update the software/firmware.

Server 500 may also include a reset controller 550 that is coupled to programmable security logic 560 through, for example, a GPIO bus. Reset controller 550 may also be integrated into programmable security logic 560. Reset controller 550 may be controlled by programmable security logic 560 and configured to hold processor(s) 510, BMC 520, and/or other untrusted components in reset or release them from reset at different times based on instructions from programmable security logic 560 or adapter device 570.

In addition, a switch 515 may be added on the communication data path between processor(s) 510 and BMC 520 (or other untrusted components) or on data paths between processors. The communication data path between processor(s) 510 and BMC 520 may include, for example, PCIe, Low Pin Count (LPC) bus, or Universal Serial Bus (USB). Switch 515 may be controlled by, for example, programmable security logic 560 or adapter device 570, using, for example, a GPIO signal, to enable or disable communications between processor(s) 510 and BMC 520. In some embodiments, switch 515 may be implemented as a buffer or multiplexer (MUX).

To make firmware stored in non-volatile memory 530 and data on server 500 secure, adapter device 570, programmable security logic 560, reset controller 550, and switch 515 may be used in combination and/or with other circuits on server 500, to verify the firmware in non-volatile memory 530 before powering up processor(s) 510 and BMC 520, clean up data of the previous client that may remain in memory associated with processor(s) 510 or other processing logic, ensure secure update of the firmware in non-volatile memory 530 when needed, prevent runtime firmware change in protected regions when server 500 is used by a client, and prevent unauthorized users from accessing client data and other resources on server 500 through, for example, network interface 590 and BMC 520.

When performing the above functions, programmable security logic 560 may operate in either a protected (secure) mode or an unprotected (open) mode at different times based on instructions from adapter device 570 or the status of server 500. In the protected mode, some or all regions in non-volatile memory 530 may not be writable and/or readable by some or all components of server 500. To accomplish this, programmable security logic 560 may maintain one or more blacklists of regions in non-volatile memory 530 that cannot be written and/or read by some or all components of server 500, one or more whitelists of regions that can be written to, or such a whitelist/blacklist may be used by a programmer to identify the memory regions that can or can't be accessed in secure mode and use it to directly program the programmable security logic before. For example, the whitelist/blacklist can be programmed by the adapter device based on a profile associated with the customer that will eventually run on the server. For example, some customers may be granted more access to modify settings of the server stored in firmware than others based on whether the customers are trusted or pay an additional fee. As such, the whitelist/blacklist can be stored in memory and used when transitioning from the open to closed mode to set which regions can be written to or not. In the unprotected mode, some or all regions in non-volatile memory may be readable and/or writable by some or all components of server 500. The access control may be based on one or more blacklists of protected regions, or one or more whitelists of unprotected regions. When programmable security logic 560 operates in the unprotected mode, processor(s) 510 and BMC 520 may generally be powered off or held in reset state to prevent these components from executing any software.

For example, before enabling any processing functions of server 500, some or all firmware in non-volatile memory 530 may be verified or validated. The firmware verification may be done by programmable security logic 560 or by adapter device 570 through programmable security logic 560. For example, the firmware stored in non-volatile memory 530 may be signed with security digital keys, and adapter device 570 or programmable security logic 560 may maintain a public digital key that can be used to verify whether the firmware read back from non-volatile memory 530 through programmable security logic 560 has been signed with correct digital keys. In some embodiments, the firmware verification may be performed by a remote network-based external key management or security authentication service, such as, for example, Amazon AWS® Key Management Services (KMS) or AWS cloud Hardware Security Module (HSM) services, which may manage digital keys for authentication and provide crypto-processing. The remote network-based external key management or security authentication service may read the firmware in non-volatile memory 530 through programmable security logic 560 and/or adapter device 570 and verify the firmware. In some embodiments, the firmware may be verified on demand at any time by programmable security logic 560, adapter device 570, and/or the remote network-based external key management or security authentication service, based on a request from an external agent, such as other security logic or an external key management or security authentication service. In some embodiments, adapter device 570 can be configured to read the firmware via the programmable security logic for each component installed on the motherboard of the server and compute one or more hash values. These hash values can be compared to reference values stored in memory of the adapter device.

In this way, the firmware for processor(s) 510, BMC 520, embedded controllers 540, and programmable security logic 560, etc. may not need to be reloaded each time the server is provisioned to a client, and adapter device 570 or programmable security logic 560 may not need to maintain a whitelist of valid firmware.

During the firmware verification, processor(s) 510 and BMC 520 (and any other execution unit) may not be powered up or may be held in reset, for example, through reset signals using reset controller 550 or through GPIO signals using adapter device 570 or programmable security logic 560 to prevent potential malicious code from interfering with secure verification of the contents of non-volatile memory 530. In some cases, reset controller 550 may be controlled by adapter device 570 directly or indirectly through programmable security logic 560. The reset signals may not be released before the verification of the firmware in non-volatile memory 530 is complete. For example, when the motherboard receives power, adapter device 570 can assert a write-enable signal to programmable security logic 560. In an example embodiment, this signal causes programmable security logic 560 to assert a reset signal that causes any execution units to be held in reset while programmable security logic 560 is in a write-enabled or open mode of operation.

During or after the verification of the firmware in non-volatile memory 530, some of the firmware may be updated. For example, firmware or settings changed by a prior customer or firmware that could not be verified or failed the verification may be replaced with appropriated firmware stored in, for example, programmable security logic 560, adapter device 570, or other storage device connected to server 500. Updates to firmware for other motherboard components, such as embedded controllers 540 for I²C devices (e.g., sensors), using existing firmware update tools and mechanisms may also be supported. In some cases, new firmware for programmable security logic 560 may be loaded in non-volatile memory 530. The firmware update may be permitted only if it is performed from trusted sources, such as adapter device 570, over, for example, hard-wired I²C, UART, or SMBus links. During firmware update, programmable security logic 560 may operate in the unprotected mode, allowing write operations to at least some regions in non-volatile memory 530 for some or all SPI devices and I²C devices connected to processor(s) 510 and BMC 520. For example, when the execution units of server 500 are held in reset, adapter device 570 can execute software that checks whether there are any firmware updates to apply by checking internal storage or contacting a remote server. Adapter device 570 can apply firmware updates by writing to non-volatile memory 530 via programmable security logic 560. Adapter device 570 can also check hashes or digital signatures on firmware. In response to detecting a mismatch between hash values or digital signatures and expected values, adapter device 570 can write the correct firmware image to non-volatile memory 530.

After the firmware verification and/or modification is complete, processor(s) 510 and BMC 520 may be released from reset and begin booting using the verified firmware in non-volatile memory 530. During the booting of server 500, firmware in non-volatile memory 530 may direct the execution units (e.g., processor(s) 510) to load certain extension firmware, for example, from an option ROM (extension to BIOS). Processor(s) 510 may run the extension firmware to, for example, scrub data remaining in memory associated with processor(s) 510 or other processing logic, such as caches, buffers, registers, or DRAMs, etc. In one example embodiment, the adapter device can first expose a preboot environment boot loader, which configures the CPU to clear RAM or memory attached to components on the motherboard by writing random values or all zeros to the memory. In this example, after the CPU runs the preboot environment code, the adapter device can reset the CPU.

Next, programmable security logic 560 may be programmed to transition to a protected mode, and devices with firmware or configurable fields may be placed in a read-only state to avoid malicious or non-malicious firmware corruption. Some regions within non-volatile memory 530 may still be writeable to support, for example, critical error logging function for the customer during runtime. The list of regions in non-volatile memory 530 that are read-only may be determined by adapter device 570 and provided to programmable security logic 560, which may then filter the write operations to non-volatile memory 530 based on the list. In some embodiments, the regions that are readable or writable may be rate-limited, for example, to a limited number of read or write accesses to specific regions per second to avoid, for example, malicious accelerated SPI wear-out attacks. For example, programmable security logic 560 can be programmed to analyze requests to non-volatile memory 530 and determine the type of command and the memory address targeted by the command, and compare the command type and memory address to a whitelist or blacklist. The logic in programmable security logic 560 can deny, filter, or rate-limit commands based on the result of the comparison.

In the protected mode, BMC 520 may also be isolated from the client data or processes to protect against runtime firmware update attempts or attempts to utilize BMC 520 as a mechanism to gain access to server 500 from an external network. Thus, the PCIe, LPC, or USB bus between processor(s) 510 and BMC 520 may be disconnected using switch 515, which, as described above, may be implemented using a high speed MUX or buffer. Switch 515 may be controlled by, for example, GPIO signals from programmable security logic 560 or adapter device 570. In some embodiments, communications between processors 510 may also be disabled by, for example, GPIO signals from programmable security logic 560 or adapter device 570.

Subsequently, the adapter device can expose a boot loader that causes a customer image, such as a virtualization system or an operating system, such as Microsoft Windows, Linux, or MacOS, to run from, for example, a network attached persistent storage device, such as a hard drive or an SSD. After the customer image is loaded through the booting process by a boot loader, the client can utilize hardware resources on server 500. During runtime of server 500, programmable security logic 560 may operate in the protected mode to prevent potential malicious or non-malicious code run by processor(s) 510, BMC 520, embedded controllers 540, or other components of server 500 from changing the contents of protected regions in non-volatile memory 530. During the runtime of server 500, communications between, for example, processor(s) 510 and BMC 520, may be disabled by the switch.

In various implementations, in the protected mode, programmable security logic 560 may be configured to filter requests for write operations to non-volatile memory 530 from I²C devices based on the blacklist of protected regions (or the whitelist of unprotected regions) or reject all requests for write operations to non-volatile memory 530 from I²C input devices. Programmable security logic 560 may also be configured to filter requests for write operations to non-volatile memory 530 using SPI buses based on the blacklist of protected regions or the whitelist of unprotected regions. Programmable security logic 560 may further be configured to monitor write operations to unprotected regions in non-volatile memory 530 using SPI buses and control access to unprotected regions in non-volatile memory 530 from processor(s) 510 or BMC 520 by throttling or denying requests if, for example, an accelerated SPI wear-out attack is identified. Programmable security logic 560 or adapter device 570 may also keep the data paths between processor(s) 510 and BMC 520 disconnected by turning off switch 515. In some implementations, in the protected mode, programmable security logic 560 may be configured to filter requests to read from non-volatile memory 530 based on a blacklist of read-protected regions (or a whitelist of unprotected regions).

In various implementations, in the unprotected mode, programmable security logic 560 may allow all I²C read and write operations to non-volatile memory 530 from some or all devices on server 500. Programmable security logic 560 may also allow firmware upgrade from trusted sources, such as adapter device 570, over, for example, hard-wired I²C, UART, or SMBus links. Programmable security logic 560 may also allow all SPI read and write operations to non-volatile memory 530 from some or all devices on server 500. In some embodiments, in the unprotected mode, SPI write operations to regions in non-volatile memory 530 may not be rate-limited. In the unprotected mode, programmable security logic 560 or adapter device 570 may hold BMC 520 and processor(s) 510 in power reset.

In some embodiments, after the firmware verification and/or modification is complete but prior to releasing processor(s) 510, BMC 520, or other execution units from reset, programmable security logic 560 may be programmed to transition to the protected mode. In the protected mode, the access to non-volatile memory 530 from some or all devices on server 500 may be controlled by programmable security logic 560 and communications between processor(s) 510, BMC 520, and other execution units may be disabled, as described above. In the protected mode, adapter device 570 may also execute code to scrub at least some portions of memory on server 500, while processor(s) 510, BMC 520, or other execution units are held in reset.

Figure 6:
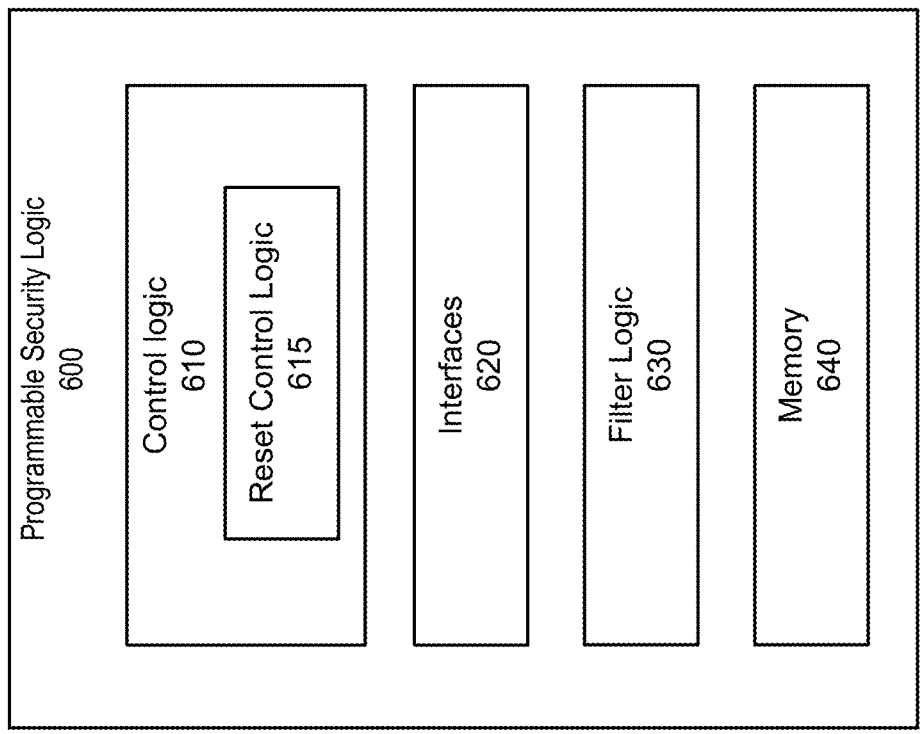
FIG. 6 is a simplified block diagram of a programmable security logic, according to certain aspects of the present disclosure.

FIG. 6 is a simplified block diagram of a programmable security logic 600, according to certain aspects of the present disclosure. FIG. 6 is for illustration purpose only and is not meant to be limiting. One skilled in the relevant art will appreciate that the disclosed illustrative functional blocks are not meant to be an exhaustive identification of all the functional blocks required by or present in a programmable security logic. Rather, illustrative functional blocks have been identified, in a non-limiting manner, to facilitate illustration of one or more aspects of the present application. Still further, the illustrative functional blocks of programmable security logic 600 may be logical in nature such that the physical implementation of one or more functional blocks can be varied or such that one or more of the logical components may be implemented in a virtualized manner. In various implementations, some of the illustrated functional blocks may be omitted, combined with other functional blocks, or split into multiple functional blocks, without deviating from the scope of the present disclosure.

In some embodiments, programmable security logic 600 may include a control logic 610, for example, for controlling the general operation of programmable security logic 600 and/or performing functions such as firmware verification as described above with respect to FIG. 5. Programmable security logic 600 may include interfaces 620, such as pins, that can be used to connect the programmable security logic to various components of a server, such as server 500 of FIG. 5. Programmable security logic 600 may include a filter logic 630 for controlling read/write access to a non-volatile memory of the server, such as non-volatile memory 530 of FIG. 5. Programmable security logic 600 may include memory 640 for storing, for example, blacklists of protected regions or whitelists of unprotected regions in the non-volatile memory.

In some embodiments, control logic 610 may include a reset control logic 615, and interfaces 620 may include an interface to a reset controller (e.g., reset controller 550 of FIG. 5). Reset control logic 615 may assert a reset signal to hold the execution units (e.g., processors, BMC, etc.) in power reset, based on, for example, signals or instructions from an adapter device (e.g., adapter device 570 of FIG. 5) and/or current status of the booting process of the server. Reset control logic 615 may then use the interface to release the reset controller, which may then release the processors from reset using reset signals through, for example, GPIO pins.

In some embodiments, interfaces 620 may include an interface to non-volatile memory. The interface to non-volatile memory may support, for example, SPI bus for enabling the adapter device to read or write through to non-volatile memory (e.g., non-volatile memory 530 of FIG. 5). Memory 640 may include blacklists of protected regions or whitelists of unprotected regions in the non-volatile memory. In some embodiments, memory 640 may maintain one blacklist for all components on the server. In some embodiments, memory 640 may maintain separate blacklist for different components on the server.

In some embodiments, interfaces 620 may include an interface to adapter device. The interface to adapter device may support, for example, SPI, I²C, GPIO, or UART bus for communicating with an adapter device. The adapter device may control the operations of programmable security logic 600, and read from or write to the non-volatile memory through programmable security logic 600. For example, the adapter device may set programmable security logic 600 to an unprotected mode after the server is powered or to a protected mode before the execution units are allowed to execute instructions. The adapter device may read firmware from the non-volatile memory through programmable security logic 600 using the interface to adapter device and verify the read-back firmware as described above. The adapter device may also update firmware in the non-volatile memory through programmable security logic 600 using the interface to adapter device. The adapter device may also provide the blacklists or the whitelists to programmable security logic 600 using the interface to adapter device. The adapter device may also control the reset controller through programmable security logic 600.

In some embodiments, interfaces 620 may include an interface to processor and filter logic 630 may include a filter logic for processor. The interface to processor may be used to receive requests to read from and/or write to the non-volatile memory from a processor (e.g., processor(s) 510 of FIG. 5), receive incoming data from the processor, and send read-back data from the non-volatile memory to the processor, through, for example, SPI, I²C, or SMBus. The filter logic for processor may be configured to filter requests for read and/or write operations to the non-volatile memory from the processor based on a blacklist of protected regions or a whitelist of unprotected regions as described above, and/or limit the rate of read or write operations to unprotected regions in the non-volatile memory by the processor.

In some embodiments, interfaces 620 may include an interface to BMC and filter logic 630 may include a filter logic for BMC. The interface to BMC may be used to receive requests to read from and/or write to the non-volatile memory from a BMC (e.g., BMC 520 of FIG. 5), receive incoming data from the BMC, and send read-back data from the non-volatile memory to the BMC, through, for example, SPI, I²C, or SMBus. The filter logic for BMC may be configured to filter requests for read and/or write operations to the non-volatile memory from the BMC based on a blacklist or a whitelist as described above, and/or limit the rate of read or write operations to unprotected regions in the non-volatile memory by the BMC.

In some embodiments, interfaces 620 may include an interface to I²C devices, which may be used to receive read and write requests to the non-volatile memory from I²C devices, such as sensors on the motherboard of the server, receive incoming data from the I²C devices, and send read-back data from the non-volatile memory to the I²C devices, through, for example, I²C or SMBus. In some embodiments, filter logic 630 may include a filter logic for I²C devices as described above with respect to the filter logic for processor and the filter logic for BMC.

In some embodiments, programmable security logic 600 may also include circuits for controlling the switch(es) on the PCIe, USB, or LPC data path between the processors (including the BMC) to connect or disconnect one processor (e.g., the BMC) and another processor, as described above with respect to FIG. 5.

Programmable security logic 600 may optionally include option firmware, which may be loaded from, for example, the adapter device or non-volatile storage medium elsewhere in a compute service system, and be used to replace or update firmware in the non-volatile memory or be used by a processor, for example, for memory scrubbing.

In various implementations, programmable security logic 600 may include one of an FPGA, an SOC, an ASIC, a PAL, and a CPLD.

Figure 7:
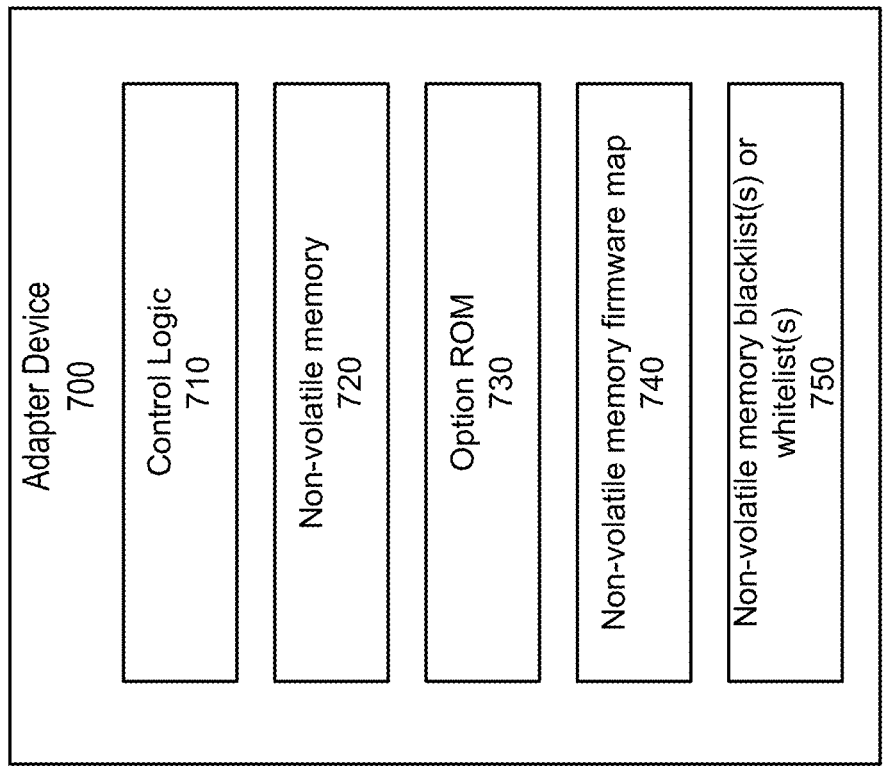
FIG. 7 is a simplified block diagram of an adapter device, according to certain aspects of the present disclosure.

FIG. 7 is a simplified block diagram of an adapter device 700, according to certain aspects of the present disclosure. As FIG. 6, FIG. 7 is for illustration purpose only and is not meant to be limiting. The illustrative functional blocks of adapter device 700 may be logical in nature such that the physical implementation of one or more functional blocks can be varied or such that one or more of the logical components may be implemented in a virtualized manner. In various implementations, some of the illustrated functional blocks may be omitted, combined with other functional blocks, or split into multiple functional blocks, without deviating from the scope of the disclosure.

In some embodiments, adapter device 700 may include a control logic 710, for example, for controlling the general operation of adapter device 700, controlling the operations of a programmable security logic (e.g., programmable security logic 560 of FIG. 5) on a server (e.g., server 500 of FIG. 5), or performing functions such as firmware verification as described above with respect to FIG. 5. Control logic 710 may determine the status of the booting process of the server, and set the programmable security logic to a protected mode or an unprotected mode accordingly. Control logic 710 may also send, for example, GPIO signals to the server to reset processors on the server or disconnect data paths between the processors on the server, for example, processor(s) 510 and BMC 520 of FIG. 5, by turning on or off a switch (e.g., switch 515 of FIG. 5). In some embodiments, control logic 710 may further load extension firmware (e.g., for memory data scrubbing) or a customer operating system or hypervisor to the server as described above.

In various embodiments, adapter device 700 may include non-volatile memory 720 for storing firmware for adapter device 700. Adapter device 700 may also include an option ROM 730, which may store extension firmware that may be used by a processor (e.g., processor(s) 510 of FIG. 5) on the server for memory data scrubbing. In some embodiments, adapter device 700 may further include a non-volatile memory firmware map 740, which may include information regarding the firmware in a non-volatile memory on the server (e.g., non-volatile memory 530 of FIG. 5), such as the address range and function of each firmware in the non-volatile memory. In some embodiments, adapter device 700 may also include one or more non-volatile memory blacklists or whitelists 750 that may be used to program the programmable security logic for controlling the access to different regions of the non-volatile memory on the server. Non-volatile memory blacklist(s) or whitelist(s) 750 may be predetermined by the compute service provider or a client, or may be determined by, for example, control logic 710 of adapter device 700 dynamically. In some embodiments, a client may request write access to certain protected regions in the non-volatile memory on the server during run time, which may be granted, for example, at an extra cost.

Figure 8:
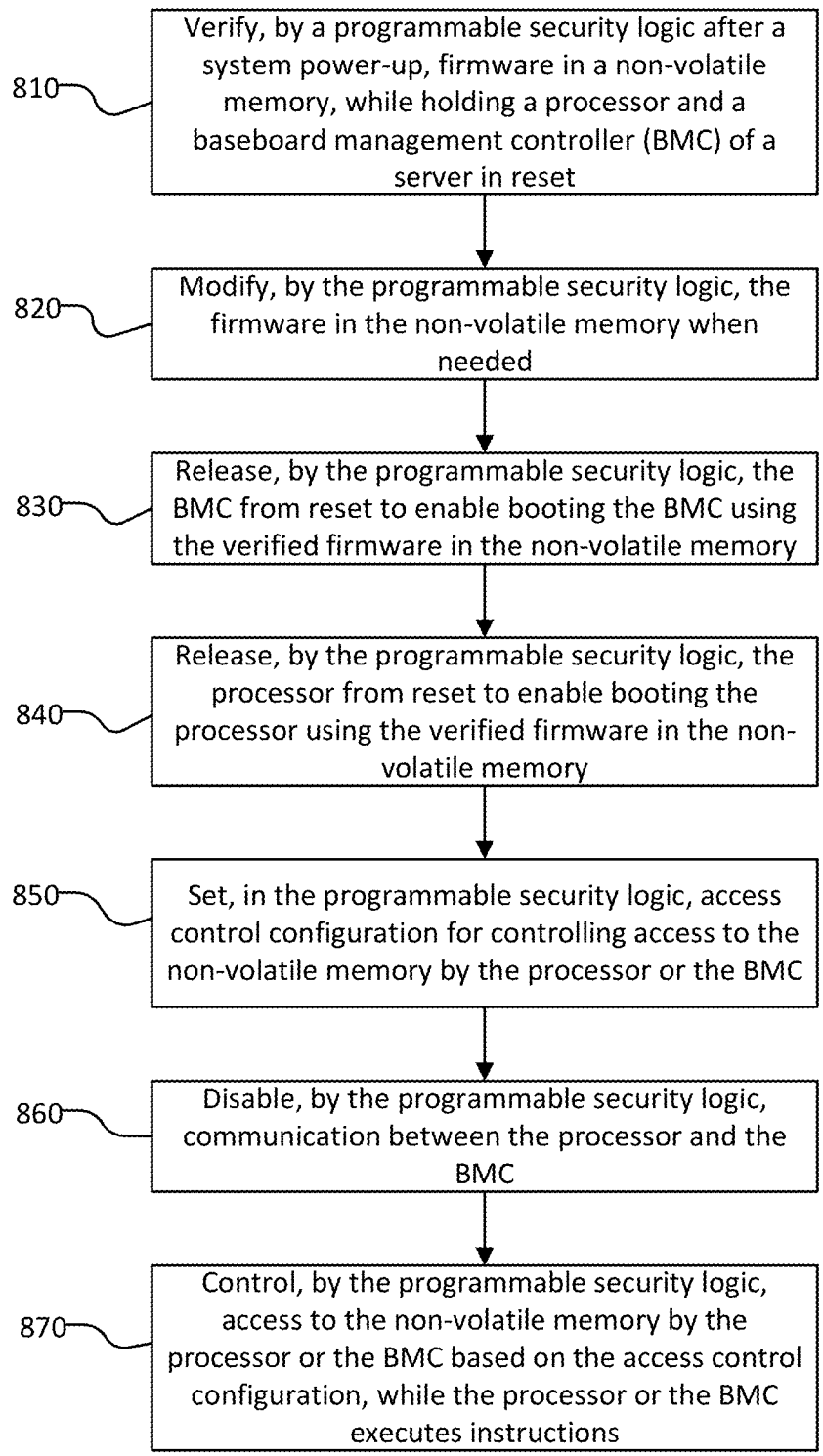
FIG. 8 illustrates an example flow diagram of a process for securing a server in a compute service system by a programmable security logic, according to certain aspects of the present disclosure.

FIG. 8 illustrates an example flow diagram of a process 800 for securing a server by a programmable security logic, according to certain aspects of the present disclosure. The process may be implemented by various systems described above, such as, for example, programmable security logic 560 of FIG. 5 or programmable security logic 600 of FIG. 6.

After the power to the server is switched on, a programmable security logic, such as programmable security logic 560 of FIG. 5 or programmable security logic 600 of FIG. 6, may assert a reset signal that causes execution units, such as processors, a BMC, or other devices coupled to the motherboard of the server to stay in reset. In one example configuration, as shown by operation 810, the programmable security logic may verify firmware in a non-volatile memory (e.g., non-volatile memory 530 of FIG. 5), while holding one or more processing units, such as processor(s) 510 of FIG. 5, BMC 520 of FIG. 5, or other processors, in reset using, for example, reset signals from reset controller 550 of FIG. 5, to prevent malicious or non-malicious code run by the one or more processing units from changing the contents of the non-volatile memory or interfering the verification of the firmware. For example, in an embodiment, the programmable security logic can be directly coupled to the reset input for the CPU and BMC. The verification of the firmware in the non-volatile memory may be performed using a public digital key that matches the digital keys used to sign the firmware or by checking hash values of the firmware to known hash values, as described above with respect to FIG. 5.

Optionally, at operation 820, the programmable security logic may modify the firmware in the non-volatile memory when needed. For example, some firmware that cannot be verified or did not pass the verification may need to be replaced. In some cases, some firmware, for example, firmware for some I²C sensor devices or the programmable security logic, may need to be updated. The programmable security logic may make the firmware replacement or update based on instructions from an adapter device, such as adapter device 570 of FIG. 5, while holding processor(s) 510 and BMC 520 in power reset using, for example, reset signals from reset controller 550 of FIG. 5, to prevent malicious or non-malicious code run by processor(s) 510 or BMC 520 from changing the contents of the non-volatile memory.

At operation 830, after the verification and/or update of the firmware in the non-volatile memory, the programmable security logic may release BMC 520 from power reset using, for example, reset signals from reset controller 550 of FIG. 5, to enable booting BMC 520 using corresponding verified firmware in the non-volatile memory. In one example, the programmable security logic may de-assert the reset signal to release the BMC from reset.

At operation 840, the programmable security logic may release processor(s) 510 from power reset using, for example, reset signals from reset controller 550 of FIG. 5, to enable booting processor(s) 510 using corresponding verified firmware in the non-volatile memory. In one example, the programmable security logic may de-assert the reset signal to release processor(s) 510 from reset. Processor(s) 510 may then be booted using the corresponding firmware, which may direct processor(s) 510 to load extension firmware from a trusted source, for example, an option ROM on the adapter device for scrubbing data in memory (e.g., caches, buffers, registers, or DRAMs, etc.) associated with processor(s) 510 or other processing logic.

At operation 850, the programmable security logic may set access control configuration in the programmable security logic for controlling access to some or all regions of the non-volatile memory, based on instructions from the adapter device. For example, after processor(s) 510 and/or BMC 520 execute the software configured to clear the memory on the server, the adapter device may receive a notification, and, in response to receiving the notification, instruct the programmable security logic to enter a protected mode and provide the programmable security logic with a blacklist of protected regions in the non-volatile memory that is not writable by processor(s) 510 or BMC 520 (or in some embodiments, the blacklist/whitelist has already been provided or set so the list doesn't need to be provided at this stage). The programmable security logic may then set the access control configuration (e.g., the protected mode and the blacklist) in, for example, control logic 610, filer logic 630, and/or memory 640 of programmable security logic 600, and begin to operate in the protected mode and filter read or write operations to the non-volatile memory using the blacklist, as described above with respect to FIGS. 5 and 6. In some implementations, a whitelist of unprotected regions, rather than the blacklist, may be used.

At operation 860, the programmable security logic may disable communications between processor(s) 510 and BMC 520 by turning on or off, for example, one or more switches, buffers, or multiplexers on the PCIe, USB, or LPC buses between processor(s) 510 and BMC 520, using, for example, a GPIO signal. The programmable security logic may remain in the protected mode and the communications between processor(s) 510 and BMC 520 may remain disabled during the client application runtime to secure the firmware in the non-volatile memory and prevent data and resources access by unauthorized users through BMC 520, until the server is powered down again. In some cases where the server includes other processors, communications between different processors may also be disabled.

At operation 870, the processor and/or BMC may access the non-volatile memory under the control of the programmable security logic and boot a customer's operating system or virtualization system. For example, the adapter device can cause the CPU to be reset again. When the CPU boots, it can be configured to locate a boot loader that directs it to obtain the customer's image from a network attached storage device and boot it. While running customer software, the processor or the BMC may access the non-volatile memory by sending a read/write request to the programmable security logic with the address of the memory space to read or write. The programmable security logic may then determine whether the access request should be granted or denied based on the access control configuration of the programmable security logic, such as, for example, the blacklist or the whitelist.

It is noted that even though FIG. 8 describes an example process as sequential operations, some of the operations may be performed in parallel or concurrently. For example, in some embodiments, operations 830 and 840 may be performed in parallel, and operations 850 and 860 may be performed in parallel. An operation may have additional steps not included in the figure. Some operations may be optional, and thus may be omitted in various embodiments. Some operations may be performed together with other operations. Furthermore, embodiments of the methods may be implemented in hardware, software, firmware, middleware, microcode, hardware description languages, or any combination thereof.

Figure 9:
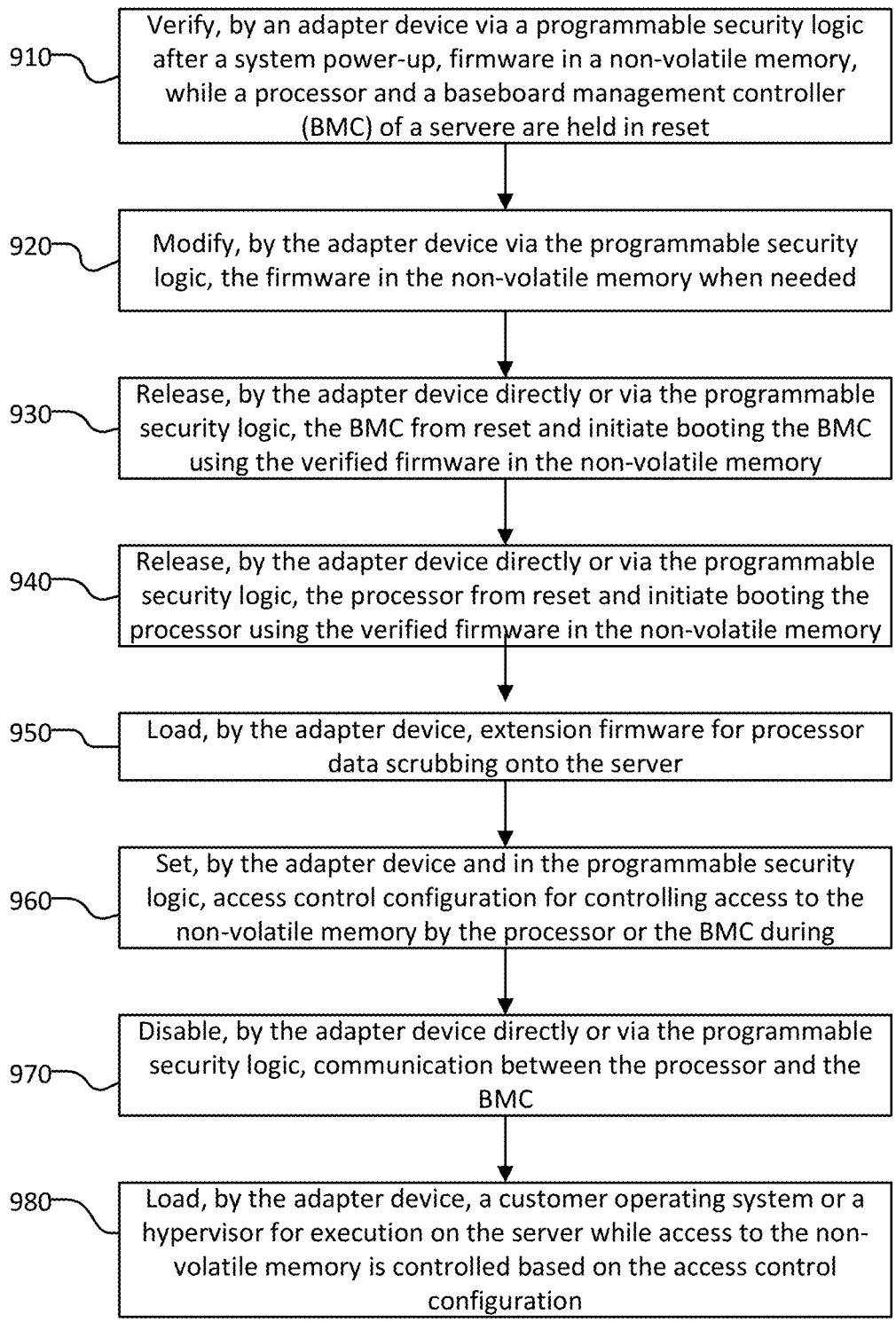
FIG. 9 illustrates an example flow diagram of a process for securing a server in a compute service system by an adapter device, according to certain aspects of the present disclosure.

FIG. 9 illustrates an example flow diagram of a process 900 for securing a server in a compute service system by an adapter device, according to certain aspects of the present disclosure. The process may be implemented by various systems described above, such as, for example, adapter device 270 of FIG. 2, adapter device 570 of FIG. 5, or adapter device 700 of FIG. 7.

At operation 910, after the power to the server is switched on but before execution units start to execute software (i.e., while the CPU is held in reset), the adapter device may read firmware in a non-volatile memory (e.g., non-volatile memory 530 of FIG. 5) (e.g., server 500 of FIG. 5) via a programmable security logic (e.g., programmable security logic 560 of FIG. 5), and verify the firmware, for example, using a public digital key that matches the digital keys used to sign the firmware, as described above with respect to FIG. 5. While the firmware are verified, one or more processors on the server, such as processor(s) 510 of FIG. 5, BMC 520 of FIG. 5, or other processors, may be held in power reset, for example, using reset signals from reset controller 550 of FIG. 5 or GPIO signals from the adapter device, to prevent the processors from executing software, which means that malicious or non-malicious code cannot be run by the processors or the BMC, which could modify the contents of the non-volatile memory or interfere with the firmware verification. For example, when power is supplied to the server, the adapter device can assert a reset signal and an enable-unprotected-mode signal to the programmable security logic. The signals can cause the programmable security logic to assert the reset signal to reset controller 550 and enter the unprotected mode. Once in the unprotected mode, adapter device can execute software to verify firmware contents by sending read requests to the programmable security logic. The requests can be routed through the programmable security logic to the various non-volatile memories on the motherboard.

Optionally, at operation 920, the adapter device may modify the firmware in the non-volatile memory when needed. For example, some firmware that cannot be verified or did not pass the verification may need to be replaced. In some cases, some firmware, for example, firmware for some $I^2C$ sensor devices or the programmable security logic, may need to be updated. The adapter device may make the firmware replacement or update through the programmable security logic, while holding the processors and the BMC in power reset using, for example, reset signals from reset controller 550 of FIG. 5 or GPIO signals from the adapter device. For example, while in the unprotected mode, the adapter device can execute instructions that update the contents of non-volatile memory. Like read requests, write requests can be routed via the programmable security logic to the respective non-volatile memory.

At operation 930, after the firmware in the non-volatile memory is verified and/or updated, the adapter device may release the BMC from power reset and enable booting the BMC using corresponding verified firmware in the non-volatile memory. The adapter device may release the BMC from reset directly using GPIO signals or indirectly through the programmable security logic using, for example, reset signals from reset controller 550 of FIG. 5. In one example, the adapter device may de-assert the reset signal to release the BMC from reset.

At operation 940, the adapter device may release the processors from reset and initiate booting the processors using the firmware in the non-volatile memory. The adapter device may release the processors from reset directly using GPIO signals or indirectly through the programmable security logic using, for example, reset signals from reset controller 550 of FIG. 5. In one example, the adapter device may de-assert the reset signal to release the processors from reset. The processors may then boot using the corresponding verified firmware, which may direct the processors to load extension firmware from a trusted source onto the server.

At operation 950, the adapter device may load extension firmware from the trusted source (e.g., an option ROM on the adapter device) onto the server for scrubbing data in memory (e.g., caches, buffers, registers, or DRAMs, etc.) associated with the processors or other processing logic. The processors may execute the extension firmware to, for example, clean up memory connected to the processors or other processing logic. In some embodiments, the extension firmware may also be used for other purposes, such as booting other components on the server or connecting the adapter device to the server. In some embodiments, at least some portions of the memory on the motherboard may be scrubbed by the adapter device without using the processors. In such embodiments, memory scrubbing by the adapter device may be performed either before the processors are released from reset, or during or after the processors boot.

At operation 960, after receiving a notification from the server that the processors and/or the BMC are booted, the adapter device may set access control configuration in the programmable security logic for controlling access to the non-volatile memory by the processors or the BMC via the programmable security logic. For example, the adapter device may instruct the programmable security logic to enter a protected mode and provide the programmable security logic with a blacklist of protected regions in the non-volatile memory that is not writable by the processors or the BMC to prohibit writing to the protected regions in the non-volatile memory by the processors or the BMC during runtime of the server. In some implementations, a whitelist of unprotected regions rather than a blacklist may be used. The programmable security logic may then use the blacklist or whitelist to filter read or write operations to the non-volatile memory through the programmable security logic, as described above with respect to FIGS. 5 and 6.

At operation 970, the adapter device may disable the communication between the processors and the BMC by turning on or off, for example, one or more switches, buffers, or multiplexers on the PCIe, USB, or LPC buses between the processors and the BMC, using, for example, a GPIO signal, directly or indirectly via the programmable security logic. In this way, unauthorized access to firmware, data, and resources through BMC by an unauthorized user may be prevented. In cases where the server includes two or more processors, communications between different processors may also be disabled.

At operation 980, the processor may load a virtualization system or customer operating system, such as Microsoft Windows, Linux, or MacOS, on the server from, for example, a persistent storage device, such as a hard drive or an SSD, for a bare-metal instance. For example, the adapter device can reset the CPU and make a boot loader for the customer's image available when the CPU resets. After the customer software is loaded through the booting process by a boot loader, the client can then run applications on the customer operating system to access and utilize the hardware resources of the server and adapter device, during which the access to the non-volatile memory may be controlled by the programmable security logic based on the access control configuration in the programmable security logic, such as, for example, the blacklist or the whitelist. For example, the processor or the BMC may access the non-volatile memory by sending a read or write request to the programmable security logic with the address of the memory space to read or write. The programmable security logic may then determine whether the access request should be granted or denied based on the access control configuration of the programmable security logic.

The adapter device may control the programmable security logic to remain in the protected mode and keep the communications between the processors and the BMC controlled during the client application runtime to secure the firmware in the non-volatile memory and prevent data and resources access by unauthorized users through BMC, until the server is reset or powered down again.

Even though FIG. 9 describes an example process as sequential operations, some of the operations may be performed in parallel or concurrently. For example, operations 930 and 940 may be performed in parallel, and operations 960 and 970 may be performed in parallel. An operation may have additional steps not included in the figure. Some operations may be optional, and thus may be omitted in various embodiments. Some operations may be performed together with another operation. Furthermore, embodiments of the methods may be implemented in hardware, software, firmware, middleware, microcode, hardware description languages, or any combination thereof.

Figure 10:
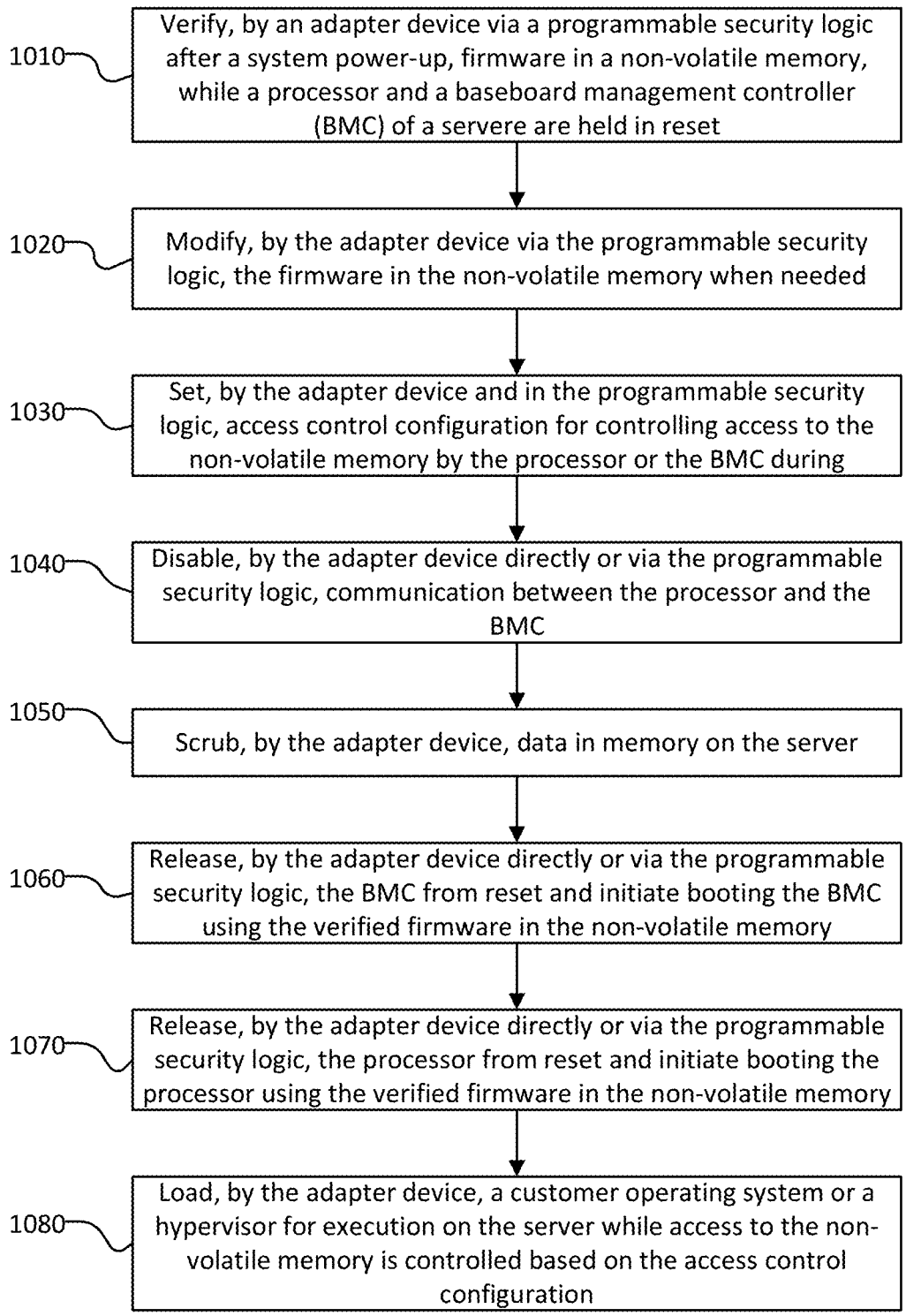
FIG. 10 illustrates an example flow diagram of a process for securing a server in a compute service system by an adapter device, according to certain aspects of the present disclosure.

FIG. 10 illustrates an example flow diagram of a process 1000 for securing a server in a compute service system by an adapter device, according to certain aspects of the present disclosure. The process may be implemented by various systems described above, such as, for example, adapter device 270 of FIG. 2, adapter device 570 of FIG. 5, or adapter device 700 of FIG. 7.

In operation 1010, after the power to the server is switched on, an adapter device associated with a server may verify, via a programmable security logic, firmware in a non-volatile memory, while a processor and a baseboard management controller (BMC) of a server are held in reset, as described above with respect to operation 910. Optionally, at operation 1020, the adapter device may modify, via the programmable security logic, the firmware in the non-volatile memory when needed, as described above with respect to operation 920.

At operation 1030, the adapter device may set access control configuration in the programmable security logic for controlling access to the non-volatile memory by the processors or the BMC via the programmable security logic. For example, the adapter device may instruct the programmable security logic to enter a protected mode and provide the programmable security logic with a blacklist of protected regions in the non-volatile memory that is not readable or writable by the processors or the BMC to prohibit reading or writing to the protected regions in the non-volatile memory by the processors or the BMC. In some implementations, a whitelist of unprotected regions rather than a blacklist may be used. The programmable security logic may then use the blacklist or whitelist to filter read or write operations to the non-volatile memory through the programmable security logic, as described above with respect to FIGS. 5 and 6.

At operation 1040, the adapter device may disable the communication between the processors and the BMC by turning on or off, for example, one or more switches, buffers, or multiplexers on the PCIe, USB, or LPC buses between the processors and the BMC, using, for example, a GPIO signal, directly or indirectly via the programmable security logic. In this way, unauthorized access to firmware, data, and resources through BMC by an unauthorized user may be prevented. In cases where the server includes two or more processors, communications between different processors may also be disabled.

At operation 1050, the adapter device may run software or firmware from a trusted resource to scrub data in at least some portions of memory (e.g., caches, buffers, registers, or DRAMs, etc.) on the server, while execution units on the motherboard of the server, such as the processors and the BMC, are held in reset. The adapter device may execute the trusted firmware or software to, for example, clean up memory connected to the processors or other processing logic. Note that, in some embodiments, operation 1050 can be executed prior to operation 1030 or 1040 so that adapter device scrubs memory when the server is in the unprotected mode.

At operation 1060, the adapter device may release the BMC from power reset and enable booting the BMC using corresponding verified firmware in the non-volatile memory. The adapter device may release the BMC from reset directly using GPIO signals or indirectly through the programmable security logic using, for example, reset signals from reset controller 550 of FIG. 5. In one example, the adapter device may de-assert the reset signal to release the BMC from reset.

At operation 1070, the adapter device may release the processors from reset and initiate booting the processors using the firmware in the non-volatile memory. The adapter device may release the processors from reset directly using GPIO signals or indirectly through the programmable security logic using, for example, reset signals from reset controller 550 of FIG. 5. In one example, the adapter device may de-assert the reset signal to release the processors from reset. The processors may then boot using the corresponding verified firmware.

At operation 1080, the processor may load a virtualization system or customer operating system, such as Microsoft Windows, Linux, or MacOS, on the server from, for example, a persistent storage device, such as a hard drive or an SSD, for a bare-metal instance. After the customer software is loaded through the booting process by a boot loader, the client can then run applications on the customer operating system to access and utilize the hardware resources of the server and adapter device, during which the access to the non-volatile memory may be controlled by the programmable security logic based on the access control configuration in the programmable security logic, such as, for example, the blacklist or the whitelist. For example, the processor or the BMC may access the non-volatile memory by sending a read or write request to the programmable security logic with the address of the memory space to read or write. The programmable security logic may then determine whether the access request should be granted or denied based on the access control configuration of the programmable security logic.

The adapter device may control the programmable security logic to remain in the protected mode and keep the communications between the processors and the BMC controlled during the client application runtime to secure the firmware in the non-volatile memory and prevent data and resources access by unauthorized users through BMC, until the server is reset or powered down again.

Even though FIG. 10 describes an example process as sequential operations, some of the operations may be performed in parallel or concurrently. For example, operations 1030 and 1040 may be performed in parallel, and operations 1060 and 1070 may be performed in parallel. An operation may have additional steps not included in the figure. Some operations may be optional, and thus may be omitted in various embodiments. Some operations may be performed together with another operation. Furthermore, embodiments of the methods may be implemented in hardware, software, firmware, middleware, microcode, hardware description languages, or any combination thereof.

Figure 11:
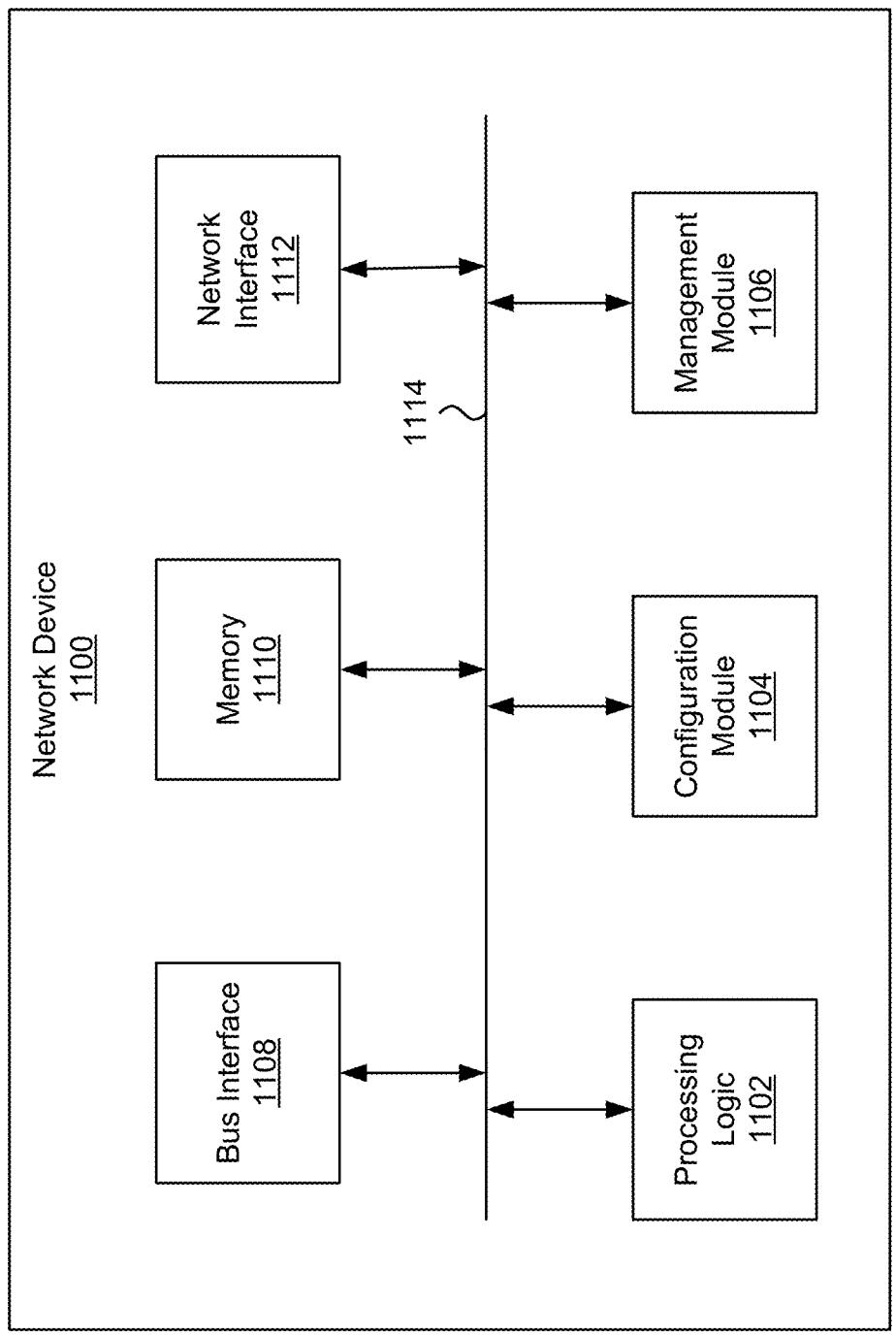
FIG. 11 illustrates an example of a network device, according to certain aspects of the disclosure.

FIG. 11 illustrates an example of a network device 1100. Functionality and/or several components of the network device 1100 may be used without limitation with other embodiments disclosed elsewhere in this disclosure, without limitations. A network device 1100 may facilitate processing of packets and/or forwarding of packets from the network device 1100 to another device. As referred to herein, a "packet" or "network packet" may refer to a variable or fixed unit of data. In some instances, a packet may include a packet header and a packet payload. The packet header may include information associated with the packet, such as the source, destination, quality of service parameters, length, protocol, routing labels, error correction information, etc. In certain implementations, one packet header may indicate information associated with a series of packets, such as a burst transaction. In some implementations, the network device 1100 may be the recipient and/or generator of packets. In some implementations, the network device 1100 may modify the contents of the packet before forwarding the packet to another device. The network device 1100 may be a peripheral device coupled to another computer device, a switch, a router or any other suitable device enabled for receiving and forwarding packets.

In one example, the network device 1100 may include processing logic 1102, a configuration module 1104, a management module 1106, a bus interface module 1108, memory 1110, and a network interface module 1112. These modules may be hardware modules, software modules, or a combination of hardware and software. In certain instances, modules may be interchangeably used with components or engines, without deviating from the scope of the disclosure. The network device 1100 may include additional modules, not illustrated here, such as components discussed with respect to the nodes disclosed in FIG. 12. In some implementations, the network device 1100 may include fewer modules. In some implementations, one or more of the modules may be combined into one module. One or more of the modules may be in communication with each other over a communication channel 1114. The communication channel 1114 may include one or more busses, meshes, matrices, fabrics, a combination of these communication channels, or some other suitable communication channel.

The processing logic 1102 may include application specific integrated circuits (ASICs), field programmable gate arrays (FPGAs), systems-on-chip (SoCs), network processing units (NPUs), processors configured to execute instructions or any other circuitry configured to perform logical arithmetic and floating point operations. Examples of processors that may be included in the processing logic 1102 may include processors developed by ARM®, MIPS®, AMD®, Intel®, Qualcomm®, and the like. In certain implementations, processors may include multiple processing cores, wherein each processing core may be configured to execute instructions independently of the other processing cores. Furthermore, in certain implementations, each processor or processing core may implement multiple processing threads executing instructions on the same processor or processing core, while maintaining logical separation between the multiple processing threads. Such processing threads executing on the processor or processing core may be exposed to software as separate logical processors or processing cores. In some implementations, multiple processors, processing cores or processing threads executing on the same core may share certain resources, such as for example busses, level 1 (L1) caches, and/or level 2 (L2) caches. The instructions executed by the processing logic 1102 may be stored on a computer-readable storage medium, for example, in the form of a computer program. The computer-readable storage medium may be non-transitory. In some cases, the computer-readable medium may be part of the memory 1110.

The memory 1110 may include either volatile or non-volatile, or both volatile and non-volatile types of memory. The memory 1110 may, for example, include random access memory (RAM), read only memory (ROM), Electrically Erasable Programmable Read-Only Memory (EEPROM), flash memory, and/or some other suitable storage media. In some cases, some or all of the memory 1110 may be internal to the network device 1100, while in other cases some or all of the memory may be external to the network device 1100. The memory 1110 may store an operating system comprising executable instructions that, when executed by the processing logic 1102, provides the execution environment for executing instructions providing networking functionality for the network device 1100. The memory may also store and maintain several data structures and routing tables for facilitating the functionality of the network device 1100.

In some implementations, the configuration module 1104 may include one or more configuration registers. Configuration registers may control the operations of the network device 1100. In some implementations, one or more bits in the configuration register can represent certain capabilities of the network device 1100. Configuration registers may be programmed by instructions executing in the processing logic 1102, and/or by an external entity, such as a host device, an operating system executing on a host device, and/or a remote device. The configuration module 1104 may further include hardware and/or software that control the operations of the network device 1100.

In some implementations, the management module 1106 may be configured to manage different components of the network device 1100. In some cases, the management module 1106 may configure one or more bits in one or more configuration registers at power up, to enable or disable certain capabilities of the network device 1100. In certain implementations, the management module 1106 may use processing resources from the processing logic 1102. In other implementations, the management module 1106 may have processing logic similar to the processing logic 1102, but segmented away or implemented on a different power plane than the processing logic 1102.

The bus interface module 1108 may enable communication with external entities, such as a host device and/or other components in a computing system, over an external communication medium. The bus interface module 1108 may include a physical interface for connecting to a cable, socket, port, or other connection to the external communication medium. The bus interface module 1108 may further include hardware and/or software to manage incoming and outgoing transactions. The bus interface module 1108 may implement a local bus protocol, such as Peripheral Component Interconnect (PCI) based protocols, Non-Volatile Memory Express (NVMe), Advanced Host Controller Interface (AHCI), Small Computer System Interface (SCSI), Serial Attached SCSI (SAS), SATA, Parallel ATA (PATA), some other standard bus protocol, or a proprietary bus protocol. The bus interface module 1108 may include the physical layer for any of these bus protocols, including a connector, power management, and error handling, among other things. In some implementations, the network device 1100 may include multiple bus interface modules for communicating with multiple external entities. These multiple bus interface modules may implement the same local bus protocol, different local bus protocols, or a combination of the same and different bus protocols.

The network interface module 1112 may include hardware and/or software for communicating with a network. This network interface module 1112 may, for example, include physical connectors or physical ports for wired connection to a network, and/or antennas for wireless communication to a network. The network interface module 1112 may further include hardware and/or software configured to implement a network protocol stack. The network interface module 1112 may communicate with the network using a network protocol, such as for example TCP/IP, InfiniBand, RoCE, Institute of Electrical and Electronics Engineers (IEEE) 802.11 wireless protocols, User Datagram Protocol (UDP), Asynchronous Transfer Mode (ATM), token ring, frame relay, HDLC, Fiber Distributed Data Interface (FDDI), and/or Point-to-Point Protocol (PPP), among others. In some implementations, the network device 1100 may include multiple network interface modules, each configured to communicate with a different network. For example, in these implementations, the network device 1100 may include a network interface module for communicating with a wired Ethernet network, a wireless 802.11 network, a cellular network, an InfiniBand network, etc.

The various components and modules of the network device 1100, described above, may be implemented as discrete components, as an SoC, as an ASIC, as an NPU, as an FPGA, or any combination thereof. In some embodiments, the SoC or other component may be communicatively coupled to another computing system to provide various services such as traffic monitoring, traffic shaping, computing, etc. In some embodiments of the technology, the SoC or other component may include multiple subsystems as disclosed with respect to FIG. 12.

Figure 12:
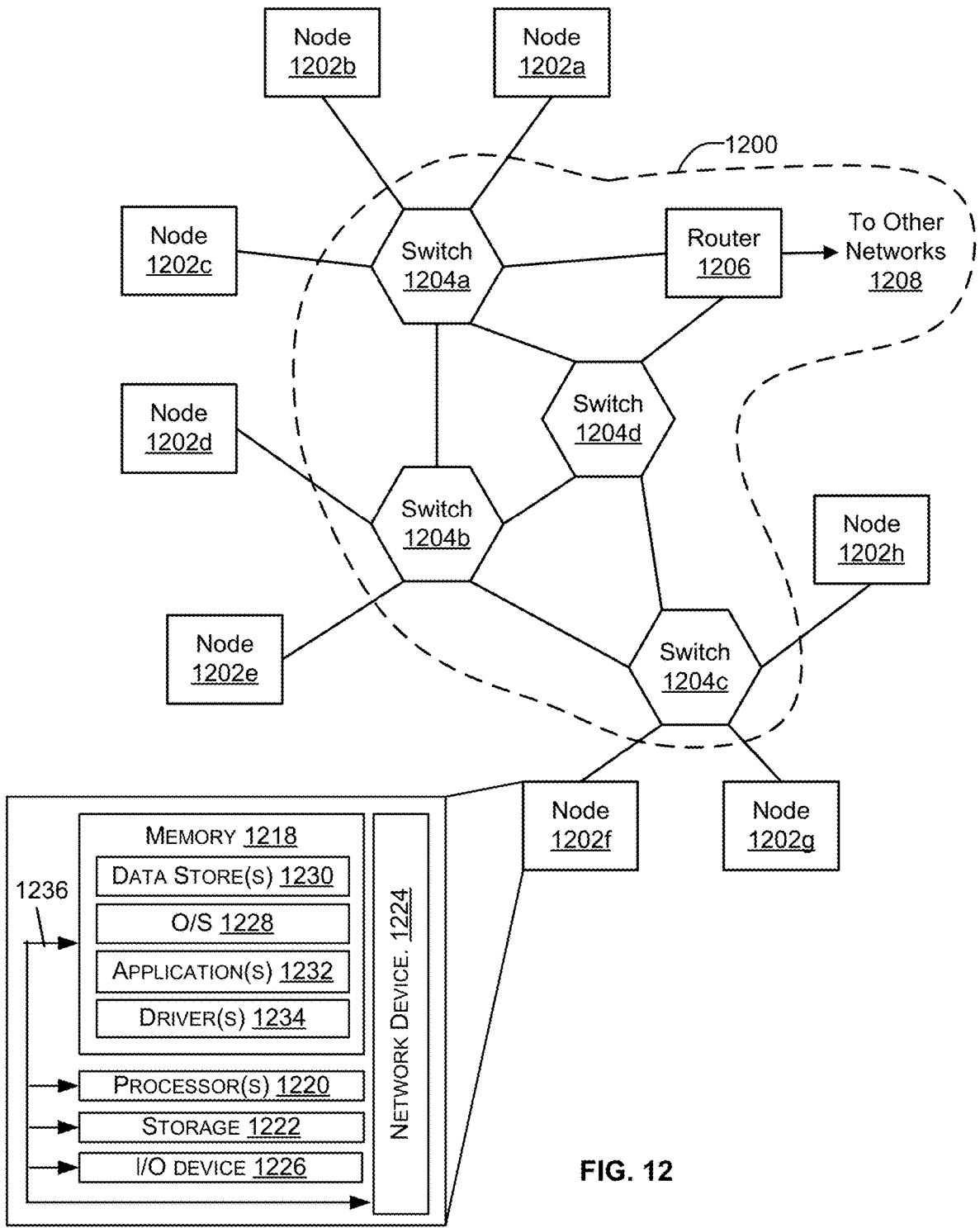
FIG. 12 illustrates an example architecture for features and systems described herein that includes one or more service provider computers and/or a user device connected via one or more networks, according to certain aspects of the disclosure.

FIG. 12 illustrates a network 1200, illustrating various different types of network devices 1100 of FIG. 11, such as nodes comprising the network device, switches and routers. In certain embodiments, the network 1200 may be based on a switched architecture with point-to-point links. As illustrated in FIG. 12, the network 1200 includes a plurality of switches 1204a-1204d, which may be arranged in a network. In some cases, the switches are arranged in a multi-layered network, such as a Clos network. A network device 1100 that filters and forwards packets between local area network (LAN) segments may be referred to as a switch. Switches generally operate at the data link layer (layer 2) and sometimes the network layer (layer 3) of the Open System Interconnect (OSI) Reference Model and may support several packet protocols. Switches 1204a-1204d may be connected to a plurality of nodes 1202a-1202h and provide multiple paths between any two nodes.

The network 1200 may also include one or more network devices 1100 for connection with other networks 1208, such as other subnets, LANs, wide area networks (WANs), or the Internet, and may be referred to as routers 1206. Routers use headers and forwarding tables to determine the best path for forwarding the packets, and use protocols such as internet control message protocol (ICMP) to communicate with each other and configure the best route between any two devices.

In some examples, network(s) 1200 may include any one or a combination of many different types of networks, such as cable networks, the Internet, wireless networks, cellular networks and other private and/or public networks. Interconnected switches 1204a-1204d and router 1206, if present, may be referred to as a switch fabric, a fabric, a network fabric, or simply a network. In the context of a computer network, terms "fabric" and "network" may be used interchangeably herein.

Nodes 1202a-1202h may be any combination of host systems, processor nodes, storage subsystems, and I/O chassis that represent user devices, service provider computers or third party computers.

User devices may include computing devices to access an application 1232 (e.g., a web browser or mobile device application). In some aspects, the application 1232 may be hosted, managed, and/or provided by a computing resources service or service provider. The application 1232 may allow the user(s) to interact with the service provider computer(s) to, for example, access web content (e.g., web pages, music, video, etc.). The user device(s) may be a computing device such as for example a mobile phone, a smart phone, a personal digital assistant (PDA), a laptop computer, a netbook computer, a desktop computer, a thin-client device, a tablet computer, an electronic book (e-book) reader, a gaming console, etc. In some examples, the user device(s) may be in communication with the service provider computer(s) via the other network(s) 1208. Additionally, the user device(s) may be part of the distributed system managed by, controlled by, or otherwise part of the service provider computer(s) (e.g., a console device integrated with the service provider computers).

The node(s) of FIG. 12 may also represent one or more service provider computers. One or more service provider computers may provide a native application that is configured to run on the user devices, which user(s) may interact with. The service provider computer(s) may, in some examples, provide computing resources such as, but not limited to, client entities, low latency data storage, durable data storage, data access, management, virtualization, cloud-based software solutions, electronic content performance management, and so on. The service provider computer(s) may also be operable to provide web hosting, databasing, computer application development and/or implementation platforms, combinations of the foregoing or the like to the user(s). In some embodiments, the service provider computer(s) may be provided as one or more virtual machines implemented in a hosted computing environment. The hosted computing environment may include one or more rapidly provisioned and released computing resources. These computing resources may include computing, networking and/or storage devices. A hosted computing environment may also be referred to as a cloud computing environment. The service provider computer(s) may include one or more servers, perhaps arranged in a cluster, as a server farm, or as individual servers not associated with one another and may host the application 1232 and/or cloud-based software services. These servers may be configured as part of an integrated, distributed computing environment. In some aspects, the service provider computer(s) may, additionally or alternatively, include computing devices such as for example a mobile phone, a smart phone, a personal digital assistant (PDA), a laptop computer, a desktop computer, a netbook computer, a server computer, a thin-client device, a tablet computer, a gaming console, etc. In some instances, the service provider computer(s), may communicate with one or more third party computers.

In one example configuration, the node(s) 1202a-1202h may include at least one memory 1218 and one or more processing units (or processor(s) 1220). The processor(s) 1220 may be implemented in hardware, computer-executable instructions, firmware, or combinations thereof. Computer-executable instruction or firmware implementations of the processor(s) 1220 may include computer-executable or machine-executable instructions written in any suitable programming language to perform the various functions described.

In some instances, the hardware processor(s) 1220 may be a single core processor or a multi-core processor. A multi-core processor may include multiple processing units within the same processor. In some embodiments, the multi-core processors may share certain resources, such as buses and second or third level caches. In some instances, each core in a single or multi-core processor may also include multiple executing logical processors (or executing threads). In such a core (e.g., those with multiple logical processors), several stages of the execution pipeline and also lower level caches may also be shared.

The memory 1218 may store program instructions that are loadable and executable on the processor(s) 1220, as well as data generated during the execution of these programs. Depending on the configuration and type of the node(s) 1202a-1202h, the memory 1218 may be volatile (such as RAM) and/or non-volatile (such as ROM, flash memory, etc.). The memory 1218 may include an operating system 1228, one or more data stores 1230, one or more applications 1232, one or more drivers 1234, and/or services for implementing the features disclosed herein.

The operating system 1228 may support nodes 1202a-1202h basic functions, such as scheduling tasks, executing applications, and/or controller peripheral devices. In some implementations, a service provider computer may host one or more virtual machines. In these implementations, each virtual machine may be configured to execute its own operating system. Examples of operating systems include Unix, Linux, Windows, Mac OS, iOS, Android, and the like. The operating system 1228 may also be a proprietary operating system.

The data stores 1230 may include permanent or transitory data used and/or operated on by the operating system 1228, applications 1232, or drivers 1234. Examples of such data include web pages, video data, audio data, images, user data, and so on. The information in the data stores 1230 may, in some implementations, be provided over the network(s) 1208 to user devices 1204. In some cases, the data stores 1230 may additionally or alternatively include stored application programs and/or drivers. Alternatively or additionally, the data stores 1230 may store standard and/or proprietary software libraries, and/or standard and/or proprietary application user interface (API) libraries. Information stored in the data stores 1230 may be machine-readable object code, source code, interpreted code, or intermediate code.

The drivers 1234 include programs that may provide communication between components in a node. For example, some drivers 1234 may provide communication between the operating system 1228 and additional storage 1222, network device 1224, and/or I/O device 1226. Alternatively or additionally, some drivers 1234 may provide communication between applications 1232 and the operating system 1228, and/or applications 1232 and peripheral devices accessible to the service provider computer. In many cases, the drivers 1234 may include drivers that provide well-understood functionality (e.g., printer drivers, display drivers, hard disk drivers, Solid State Device drivers). In other cases, the drivers 1234 may provide proprietary or specialized functionality.

The service provider computer(s) or servers may also include additional storage 1222, which may include removable storage and/or non-removable storage. The additional storage 1222 may include magnetic storage, optical disks, solid state disks, flash memory, and/or tape storage. The additional storage 1222 may be housed in the same chassis as the node(s) 1202a-1202h or may be in an external enclosure. The memory 1218 and/or additional storage 1222 and their associated computer-readable media may provide non-volatile storage of computer-readable instructions, data structures, program modules, and other data for the computing devices. In some implementations, the memory 1218 may include multiple different types of memory, such as SRAM, DRAM, or ROM.

The memory 1218 and the additional storage 1222, both removable and non-removable, are examples of computer-readable storage media. For example, computer-readable storage media may include volatile or non-volatile, removable or non-removable media implemented in a method or technology for storage of information, the information including, for example, computer-readable instructions, data structures, program modules, or other data. The memory 1218 and the additional storage 1222 are examples of computer storage media. Additional types of computer storage media that may be present in the node(s) 1202a-1202h may include, but are not limited to, PRAM, SRAM, DRAM, RAM, ROM, EEPROM, flash memory or other memory technology, CD-ROM, DVD or other optical storage, magnetic cassettes, magnetic tape, magnetic disk storage or other magnetic storage devices, solid state drives, or some other medium which can be used to store the desired information and which can be accessed by the node(s) 1202a-1202h. Computer-readable media also includes combinations of any of the above media types, including multiple units of one media type.

Alternatively or additionally, computer-readable communication media may include computer-readable instructions, program modules or other data transmitted within a data signal, such as a carrier wave or other transmission. However, as used herein, computer-readable storage media does not include computer-readable communication media.

The node(s) 1202a-1202h may also include I/O device(s) 1226, such as a keyboard, a mouse, a pen, a voice input device, a touch input device, a display, speakers, a printer, and the like. The node(s) 1202a-1202h may also include one or more communication channels 1236. A communication channel 1236 may provide a medium over which the various components of the node(s) 1202a-1202h can communicate. The communication channel or channels 1236 may take the form of a bus, a ring, a switching fabric, or a network.

The node(s) 1202a-1202h may also contain network device(s) 1224 that allow the node(s) 1202a-1202h to communicate with a stored database, another computing device or server, user terminals and/or other devices on the network(s) 1200. The network device(s) 1224 of FIG. 12 may include similar components discussed with reference to the network device 1100 of FIG. 11.

In some implementations, the network device 1224 is a peripheral device, such as a PCI-based device. In these implementations, the network device 1224 includes a PCI interface for communicating with a host device. The term "PCI" or "PCI-based" may be used to describe any protocol in the PCI family of bus protocols, including the original PCI standard, PCI-X, Accelerated Graphics Port (AGP), and PCI-Express (PCIe) or any other improvement or derived protocols that are based on the PCI protocols discussed herein. The PCI-based protocols are standard bus protocols for connecting devices, such as a local peripheral device to a host device. A standard bus protocol is a data transfer protocol for which a specification has been defined and adopted by various manufacturers. Manufacturers ensure that compliant devices are compatible with computing systems implementing the bus protocol, and vice versa. As used herein, PCI-based devices also include devices that communicate using Non-Volatile Memory Express (NVMe). NVMe is a device interface specification for accessing non-volatile storage media attached to a computing system using PCIe. For example, the bus interface module 1108 may implement NVMe, and the network device 1224 may be connected to a computing system using a PCIe interface.

A PCI-based device may include one or more functions. A "function" describes operations that may be provided by the network device 1224. Examples of functions include mass storage controllers, network controllers, display controllers, memory controllers, serial bus controllers, wireless controllers, and encryption and decryption controllers, among others. In some cases, a PCI-based device may include more than one function. For example, a PCI-based device may provide a mass storage controller and a network adapter. As another example, a PCI-based device may provide two storage controllers, to control two different storage resources. In some implementations, a PCI-based device may have up to eight functions.

In some implementations, the network device 1224 may include single-root I/O virtualization (SR-IOV). SR-IOV is an extended capability that may be included in a PCI-based device. SR-IOV allows a physical resource (e.g., a single network interface controller) to appear as multiple resources (e.g., sixty-four network interface controllers). Thus, a PCI-based device providing a certain functionality (e.g., a network interface controller) may appear to a device making use of the PCI-based device to be multiple devices providing the same functionality. The functions of an SR-IOV-capable storage adapter device may be classified as physical functions (PFs) or virtual functions (VFs). Physical functions are fully featured functions of the device that can be discovered, managed, and manipulated. Physical functions have configuration resources that can be used to configure or control the storage adapter device. Physical functions include the same configuration address space and memory address space that a non-virtualized device would have. A physical function may have a number of virtual functions associated with it. Virtual functions are similar to physical functions, but are light-weight functions that may generally lack configuration resources, and are generally controlled by the configuration of their underlying physical functions. Each of the physical functions and/or virtual functions may be assigned to a respective thread of execution (such as for example, a virtual machine) running on a host device.

The modules described herein may be software modules, hardware modules or a suitable combination thereof. If the modules are software modules, the modules can be embodied on a non-transitory computer readable medium and processed by a processor in any of the computer systems described herein. It should be noted that the described processes and architectures can be performed either in real-time or in an asynchronous mode prior to any user interaction. The modules may be configured in the manner suggested in FIG. 11, FIG. 12, and/or functions described herein can be provided by one or more modules that exist as separate modules and/or module functions described herein can be spread over multiple modules.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the disclosure to the specific form or forms disclosed, but on the contrary, the intention is to cover all modifications, alternative constructions, and equivalents falling within the spirit and scope of the disclosure, as defined in the appended claims.

As used herein, volatile memory may refer to a type of data storage device whose contents may be lost when the power to the data storage device is turned off or interrupted, such as random access memory (RAM), while non-volatile memory may refer to a type of data storage device whose contents can persist even without power, such as read-only memory (ROM) or flash memory.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the disclosure and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Various embodiments of this disclosure are described herein, including the best mode known to the inventors for carrying out the disclosure. Variations of those embodiments may become apparent to those of ordinary skill in the art upon reading the foregoing description. The inventors expect skilled artisans to employ such variations as appropriate and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

What is claimed is:

1. A server comprising:
    a motherboard;
    a non-volatile memory storing firmware and coupled to the motherboard;
    a programmable security logic circuit coupled to the motherboard and the non-volatile memory, the programmable security logic circuit being switchable between an unprotected mode in which the programmable security logic circuit allows access to the non-volatile memory by at least some devices of the server, and a protected mode in which the programmable security logic circuit denies access to the non-volatile memory by the at least some devices of the server;
    a processor coupled to the motherboard and the programmable security logic circuit, the processor communicatively coupled to the non-volatile memory via the programmable security logic circuit, wherein the at least some devices of the server include the processor;
    an adapter device separate from and communicatively coupled to the programmable security logic circuit and the processor, the adapter device including instructions that, upon execution by the adapter device, cause the adapter device to:
        set the programmable security logic circuit to the unprotected mode;
        hold the processor in power reset while the programmable security logic circuit is in the unprotected mode, wherein the unprotected mode allows the adapter device to access the firmware through the programmable security logic circuit;
        verify the firmware in the non-volatile memory, while the processor is held in power reset and the programmable security logic circuit is in the unprotected mode;
        release the processor from power reset after the firmware in the non-volatile memory is verified, thereby causing the processor to execute a preboot environment;
        set the programmable security logic circuit to the protected mode after the processor completes execution of the preboot environment; and
        cause the server to load a customer operating system or a hypervisor while the programmable security logic circuit is in the protected mode; and
    a baseboard management controller (BMC) coupled to the processor and the adapter device, wherein, in the protected mode, the programmable security logic circuit denies at least a portion of requests from the BMC to write to the non-volatile memory and disables a communication bus between the processor and the BMC, and wherein, in the protected mode, the programmable security logic circuit also denies at least a portion of requests by the processor to write to the non-volatile memory.

2. The server of claim 1, wherein:
    the adapter device includes instructions that, upon execution, cause the adapter device to execute the preboot environment by causing the processor to execute extension firmware; and
    the extension firmware includes instructions that, upon execution by the processor, scrub volatile memory on the motherboard.

3. The server of claim 1, wherein:
    the adapter device stores, in the programmable security logic circuit, a list of protected regions in the non-volatile memory that cannot be written by the processor in the protected mode.

4. The server of claim 1, wherein the BMC is communicatively coupled to the non-volatile memory via the programmable security logic circuit.

5. A server comprising:
    a non-volatile memory storing firmware;
    a programmable security logic circuit coupled to the non-volatile memory, the programmable security logic circuit being switchable between an unprotected mode in which the programmable security logic circuit allows access to the non-volatile memory by at least some devices of the server, and a protected mode in which the programmable security logic circuit denies access to the non-volatile memory by the at least some devices of the server;

a processor coupled to the programmable security logic circuit and communicatively coupled to the non-volatile memory via the programmable security logic circuit;

an adapter device separate from and communicatively coupled to the programmable security logic circuit and the processor, wherein the adapter device includes instructions that, upon execution, cause the adapter device to:
verify the firmware in the non-volatile memory, while the processor is held in reset and the programmable security logic circuit is in the unprotected mode, wherein the unprotected mode allows the adapter device to access the firmware through the programmable security logic circuit;
after verifying the firmware, set the programmable security logic circuit to the protected mode; and
cause the processor to load a customer image after the processor is released from reset; and a baseboard management controller (BMC) coupled to the processor and the adapter device, wherein, in the protected mode, the programmable security logic circuit denies at least a portion of requests from the BMC to write to the non-volatile memory and disables a communication bus between the processor and the BMC.

6. The server of claim 5, wherein the adapter device includes instructions that, upon execution, cause the adapter device to:
cause the server to, while the programmable security logic circuit is in the protected mode, load a customer operating system and boot the server using the customer operating system.

7. The server of claim 5, wherein the programmable security logic circuit is configured to, before entering the protected mode, grant at least a portion of requests to write to the non-volatile memory.

8. The server of claim 5, wherein the adapter device includes instructions that, upon execution, cause the adapter device to:
store, in the programmable security logic circuit, a list of protected regions in the non-volatile memory.

9. The server of claim 8, wherein the programmable security logic circuit is configured to:
grant requests to write to the protected regions in the non-volatile memory before entering the protected mode; and
deny requests to write to the protected regions in the protected mode.

10. The server of claim 5, wherein the BMC is communicatively coupled to the non-volatile memory via the programmable security logic circuit, wherein the non-volatile memory stores firmware for the BMC, and wherein the adapter device includes instructions that, upon execution, cause the adapter device to:
verify the firmware for the BMC in the non-volatile memory, while the processor is held in power reset; and
cause the programmable security logic circuit to release the BMC from power reset after the firmware for the BMC is verified, thereby causing the BMC to boot.

11. The server of claim 5, wherein the adapter device includes instructions that, upon execution, cause the adapter device to:
send, directly or via the programmable security logic circuit, a general purpose input/output (GPIO) signal to disable communications between the BMC and the processor.

12. The server of claim 5, wherein the programmable security logic circuit or the adapter device is configured to:
send a reset signal to the processor to hold the processor in reset while the adapter device verifies the firmware in the non-volatile memory; and
send a reset release signal to the processor to release the processor from reset after the firmware in the non-volatile memory is verified.

13. The server of claim 5, wherein the adapter device includes instructions that, upon execution, cause the adapter device to:
cause the processor to be released from reset; and
cause the processor to execute instructions for scrubbing at least a portion of volatile memory on the server.

14. The server of claim 5, wherein the adapter device includes instructions that, upon execution, cause the adapter device to:
hold the processor in reset directly or via the programmable security logic circuit;
read, via the programmable security logic circuit in the unprotected mode, the firmware from the non-volatile memory;
verify the firmware using a digital key; and
release, after the firmware is verified, the processor from reset directly or via the programmable security logic circuit.

15. The server of claim 5, wherein at least a portion of requests to write to the non-volatile memory are granted by the programmable security logic circuit in the protected mode.

16. The server of claim 5, wherein the adapter device includes instructions that, upon execution, cause the adapter device to:
provide extension firmware to the processor, wherein the extension firmware comprises instructions that, upon execution by the processor, scrub at least a portion of volatile memory on the server before the programmable security logic circuit enters the protected mode.

17. The server of claim 5, wherein the adapter device includes instructions that, upon execution, cause the adapter device to:
scrub at least a portion of volatile memory on the server before the processor is released from power reset.

18. The server of claim 5, wherein the adapter device includes instructions that, upon execution, cause the adapter device to:
modify the firmware in the non-volatile memory via the programmable security logic circuit while the processor is held in reset.

19. The server of claim 5, further comprising:
a second processor,
wherein the programmable security logic circuit or the adapter device is configured to disable communications between the processor and the second processor in the protected mode.

20. The server of claim 5, wherein the adapter device includes a plug-in card.

21. The server of claim 5, wherein the programmable security logic circuit is configured to, in the protected mode, grant a limited number of requests to read or write a region in the non-volatile memory during a time period.

22. The server of claim 5, wherein the programmable security logic circuit comprises at least one of a field-programmable gate array (FPGA), a system-on-chip (SoC), an application specific integrated circuit (ASIC), a programmable array logic (PAL), or a complex programmable logic device (CPLD).

23. A method for securing firmware in a non-volatile memory on a server, the method comprising:
 verifying, by an adapter device, the firmware in the non-volatile memory while a processor is held in power reset and a programmable security logic circuit is in an unprotected mode, wherein the programmable security logic circuit couples the adapter device to the non-volatile memory and couples the processor to the non-volatile memory, wherein the programmable security logic circuit is switchable between the unprotected mode and a protected mode, and wherein in the unprotected mode the programmable security logic circuit allows the adapter device to access the firmware through the programmable security logic circuit and also allows access to the non-volatile memory by at least some devices of the server;
 after verifying the firmware, setting, by the adapter device, the programmable security logic circuit to the protected mode, wherein, in the protected mode, the programmable security logic circuit denies requests, from a baseboard management controller (BMC) coupled to the processor and the adapter device, to write to the non-volatile memory and disables a communication bus between the processor and the BMC; and
 causing the processor to load a customer image after the processor is released from reset.

24. The method of claim 23, further comprising:
 setting, in the programmable security logic circuit, a list of protected regions in the non-volatile memory;
 receiving, by the programmable security logic circuit in the protected mode, a request to access a region of the non-volatile memory via the programmable security logic circuit; and
 denying or granting the request based at least in part on the list of protected regions.

25. The method of claim 23, wherein verifying the firmware includes:
 reading the firmware in the non-volatile memory via the programmable security logic circuit; and
 verifying the read firmware using a digital key or sending the read firmware to a remote network-based service for firmware verification.

26. The method of claim 23, further comprising:
 disabling, by the adapter device or the programmable security logic circuit and while the programmable security logic circuit is in the protected mode, communications between the processor and a second processor.

* * * * *